(12) United States Patent
Kumagai et al.

(10) Patent No.: US 12,734,762 B2
(45) **Date of Patent: *Sep. 15, 2026**

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventors: Masaru Kumagai, Shiojiri (JP); Kohei Utsunomiya, Matsumoto (JP); Yuki Ishii, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 85 days.

This patent is subject to a terminal disclaimer.

(21) Appl. No.: 18/439,909

(22) Filed: Feb. 13, 2024

(65) Prior Publication Data

US 2024/0269933 A1 Aug. 15, 2024

(30) Foreign Application Priority Data

Feb. 14, 2023 (JP) ................................ 2023-020936

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/393; B29C 64/232; B29C 64/209; B29C 64/236; B29C 64/112; B33Y 10/00; B33Y 30/00
See application file for complete search history.

(56) References Cited

U.S. PATENT DOCUMENTS

2011/0249298 A1 10/2011 Gullentops et al.
2015/0042716 A1 2/2015 Beier et al.
(Continued)

FOREIGN PATENT DOCUMENTS

JP 2015-520011 A 7/2015
JP 2022-066696 A 5/2022
JP 2022-070443 A 5/2022

*Primary Examiner* — JaMel M Nelson
(74) *Attorney, Agent, or Firm* — Harness, Dickey & Pierce, P.L.C.

(57) ABSTRACT

A three-dimensional object printing apparatus includes a head that ejects a liquid to a printing region on a workpiece, and a movement mechanism that changes a relative position and posture between the workpiece and the head, and executes a first printing operation and a second printing operation. The printing region includes a first band region into which the liquid is ejected in the first printing operation and a second band region into which the liquid is ejected in the second printing operation. When a width of the first band region at a first position is set as a first width and a width of the first band region at a second position is set as a second width, the first width is less than the second width, and a part of the printing region overlaps with a part of the second band region at the first position.

8 Claims, 17 Drawing Sheets

(51) Int. Cl.

| | |
|---|---|
| ***B29C 64/209*** | (2017.01) |
| ***B29C 64/232*** | (2017.01) |
| ***B29C 64/236*** | (2017.01) |
| ***B33Y 10/00*** | (2015.01) |
| ***B33Y 30/00*** | (2015.01) |

(52) U.S. Cl.

CPC .......... *B29C 64/232* (2017.08); *B29C 64/236* (2017.08); *B33Y 10/00* (2014.12); *B33Y 30/00* (2014.12)

(56) References Cited

U.S. PATENT DOCUMENTS

| | | | |
|---|---|---|---|
| 2016/0355026 | A1 | 12/2016 | Mathis et al. |
| 2020/0215834 | A1 | 7/2020 | Bauer |
| 2020/0406617 | A1 | 12/2020 | Tawata |
| 2022/0118680 | A1* | 4/2022 | Kumagai .......... B41J 11/00212 |
| 2022/0126513 | A1 | 4/2022 | Mochizuki et al. |

* cited by examiner

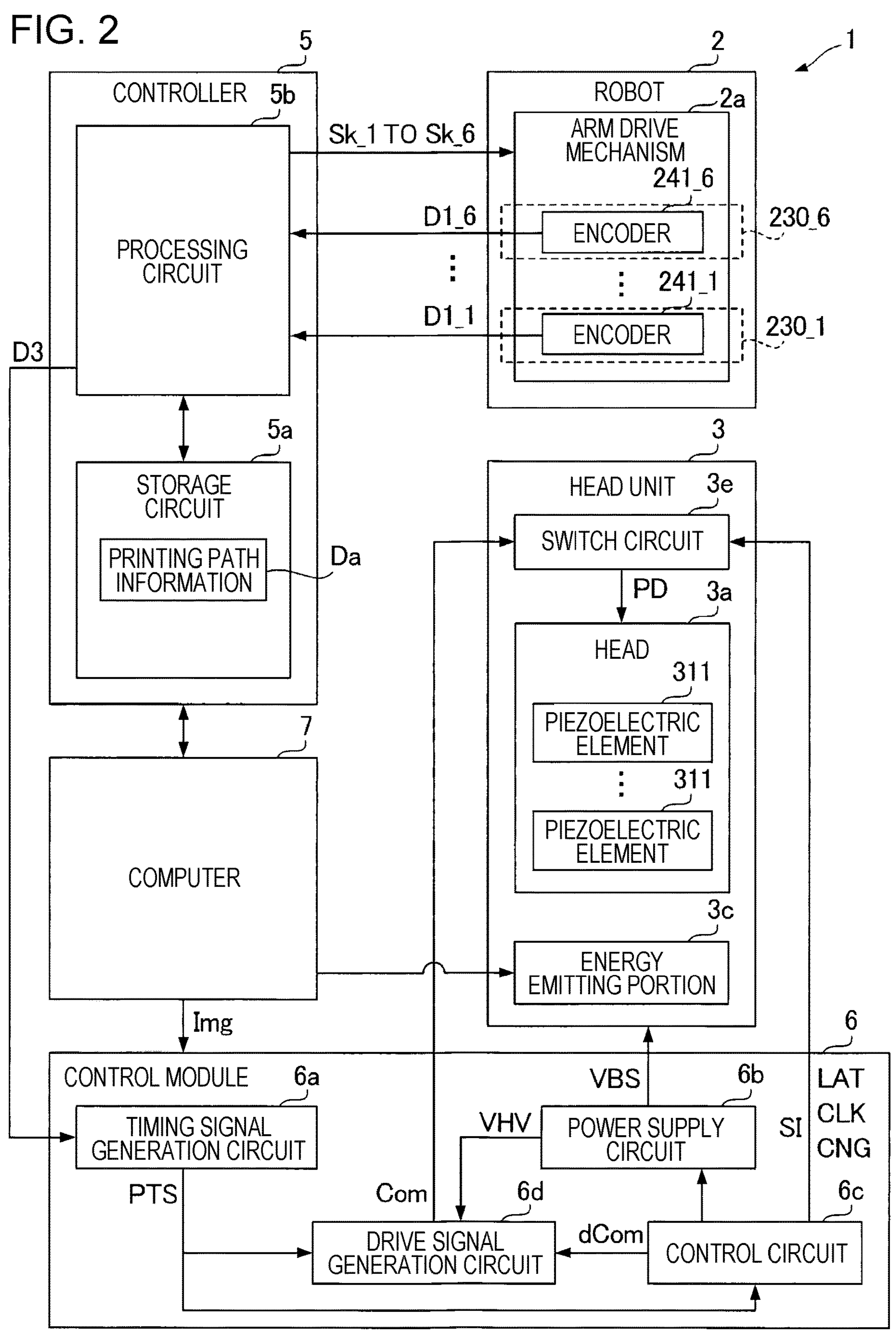

FIG. 2
5
CONTROLLER
5b
PROCESSING CIRCUIT
Sk_1 TO Sk_6
2
ROBOT
2a
ARM DRIVE MECHANISM
241_6
D1_6
ENCODER
230_6
241_1
D1_1
ENCODER
230_1
1
D3
5a
STORAGE CIRCUIT
PRINTING PATH INFORMATION
Da
3
HEAD UNIT
3e
SWITCH CIRCUIT
PD
3a
HEAD
311
PIEZOELECTRIC ELEMENT
311
PIEZOELECTRIC ELEMENT
7
COMPUTER
3c
ENERGY EMITTING PORTION
Img
6
CONTROL MODULE
6a
TIMING SIGNAL GENERATION CIRCUIT
VBS
6b
POWER SUPPLY CIRCUIT
VHV
SI
LAT
CLK
CNG
PTS
Com
6d
DRIVE SIGNAL GENERATION CIRCUIT
dCom
6c
CONTROL CIRCUIT

FIG. 15
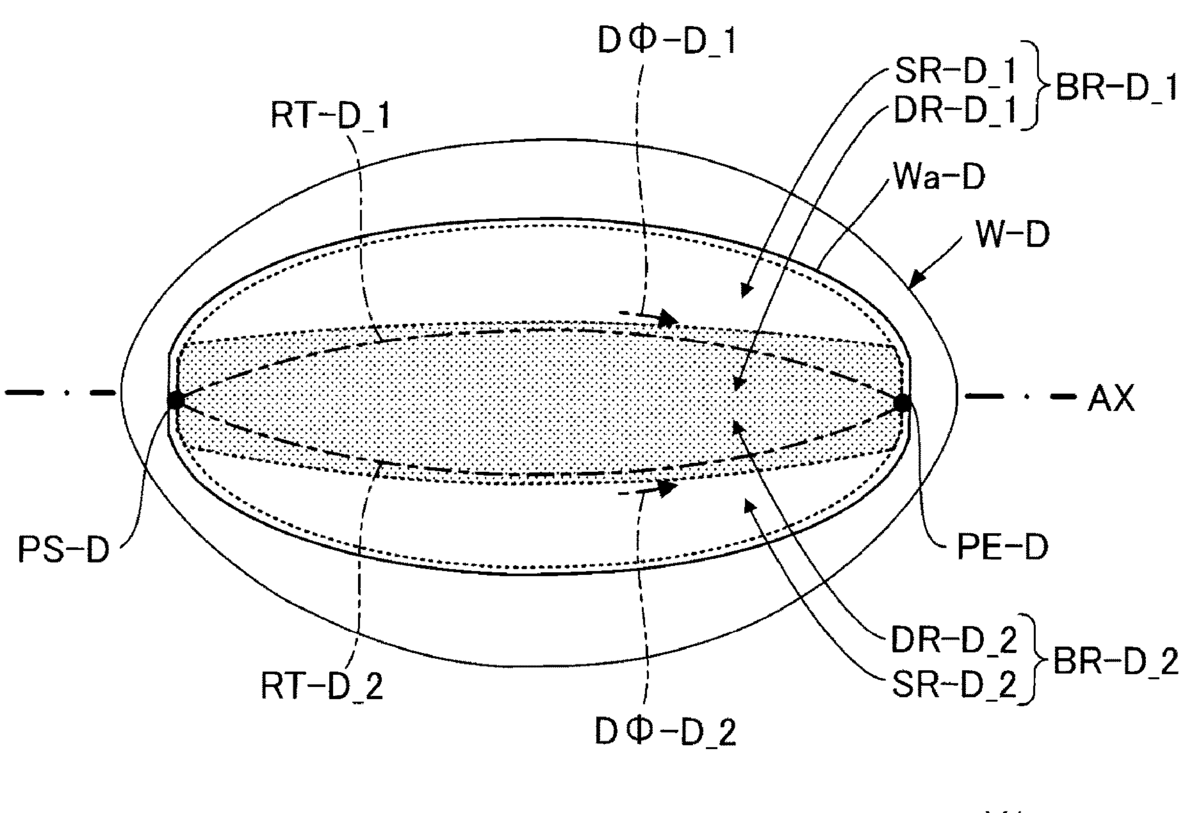
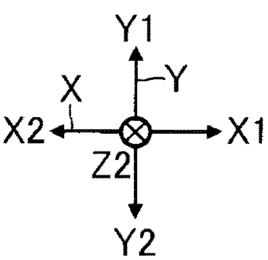

THREE-DIMENSIONAL OBJECT PRINTING APPARATUS AND THREE-DIMENSIONAL OBJECT PRINTING METHOD

The present application is based on, and claims priority from JP Application Serial Number 2023-020936, filed Feb. 14, 2023, the disclosure of which is hereby incorporated by reference herein in its entirety.

BACKGROUND

1. Technical Field

The present disclosure relates to a three-dimensional object printing apparatus and a three-dimensional object printing method.

2. Related Art

In the related art, a three-dimensional object printing apparatus that performs printing on a surface of a three-dimensional workpiece by an ink jet method using a robot is known. For example, JP-A-2022-66696 discloses a three-dimensional object printing apparatus that performs printing on a surface of a workpiece having a curved surface.

Meanwhile, in the technique in the related art described above, when a printing region on the workpiece is divided into a plurality of regions and printed, there is a problem that a quality of an image formed at the printing region deteriorates when a start position in any region of the plurality of regions deviates from an ideal start position.

SUMMARY

According to an aspect of the present disclosure, there is provided a three-dimensional object printing apparatus including: a head that ejects a liquid to a printing region on a workpiece; a movement mechanism that changes a relative position and posture between the workpiece and the head; and a control portion that controls the head and the movement mechanism, in which the control portion executes a first printing operation of ejecting the liquid from the head to the workpiece while changing the relative position between the workpiece and the head along a first main scanning direction, and a second printing operation of ejecting the liquid from the head to the workpiece while changing the relative position between the workpiece and the head along a second main scanning direction, the printing region includes a first band region into which the liquid is ejected from the head in the first printing operation, and a second band region into which the liquid is ejected from the head in the second printing operation, and when a width of the first band region at a first position in the first main scanning direction is set as a first width, and a width of the first band region at a second position different from the first position in the first main scanning direction is set as a second width, the first width is less than the second width, and a part of the first band region overlaps with a part of the second band region at the first position.

According to another aspect of the present disclosure, there is provided a three-dimensional object printing method for a three-dimensional object printing apparatus including a head that ejects a liquid to a printing region on a workpiece, and a movement mechanism that changes a relative position and posture between the workpiece and the head, the method including: a first printing operation of ejecting the liquid from the head to the workpiece while changing the relative position between the workpiece and the head along a first main scanning direction; and a second printing operation of ejecting the liquid from the head to the workpiece while changing the relative position between the workpiece and the head along a second main scanning direction, in which the printing region includes a first band region into which the liquid is ejected from the head in the first printing operation, and a second band region into which the liquid is ejected from the head in the second printing operation, and when a width of the first band region at a first position in the first main scanning direction is set as a first width, and a width of the first band region at a second position different from the first position in the first main scanning direction is set as a second width, the first width is less than the second width, and a part of the first band region overlaps with a part of the second band region at the first position.

BRIEF DESCRIPTION OF THE DRAWINGS

FIG. 2 is a block diagram illustrating an electrical configuration of the three-dimensional object printing apparatus according to the first embodiment.

FIG. 3 is a perspective view illustrating a schematic configuration of a head unit.

FIG. 15 is a diagram describing a band region according to a fourth embodiment.

DESCRIPTION OF EMBODIMENTS

Figure 1:
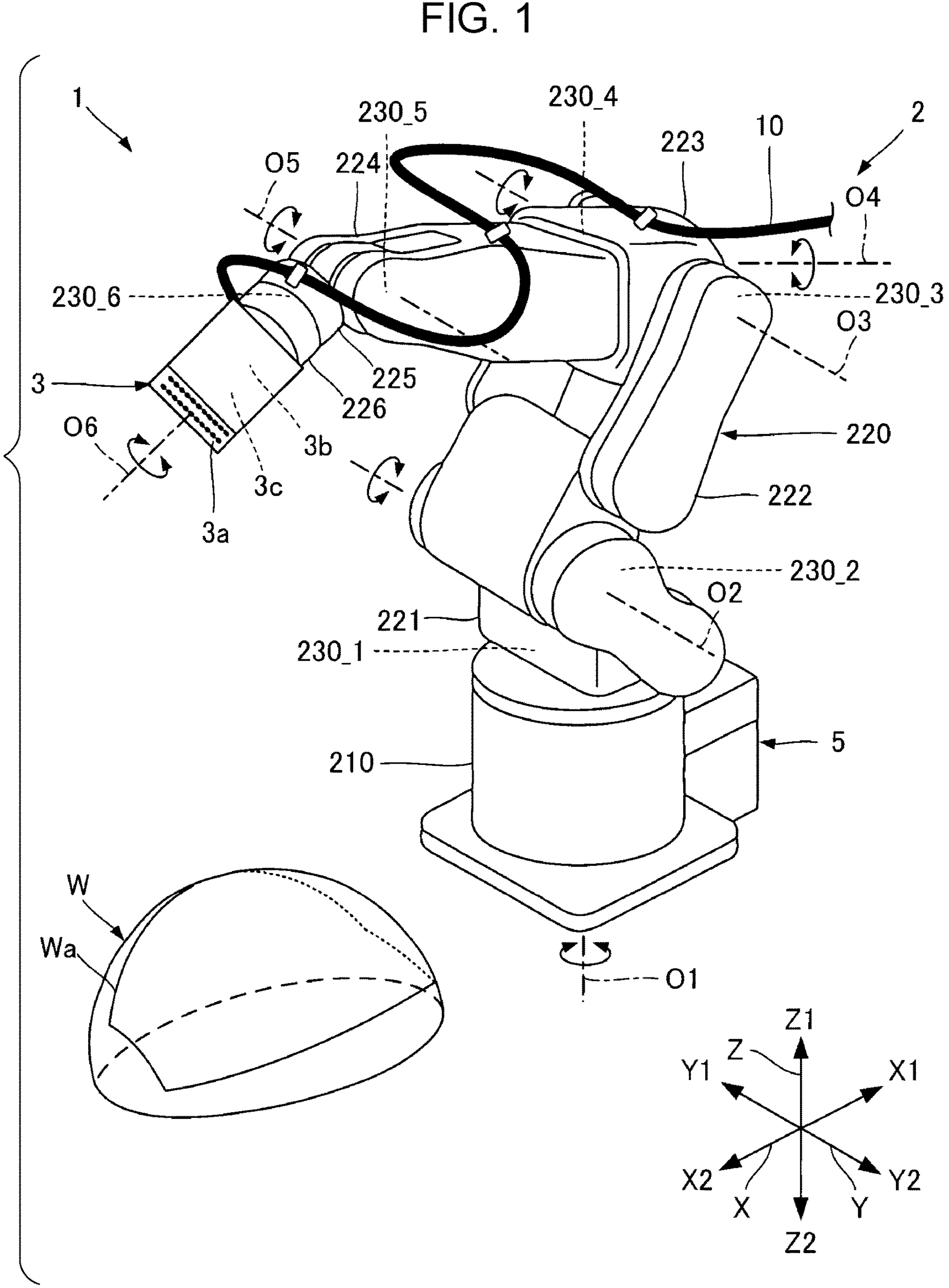
FIG. 1 is a perspective view illustrating an overview of a three-dimensional object printing apparatus according to a first embodiment.

Hereinafter, appropriate embodiments according to the present disclosure will be described with reference to the accompanying drawings. In the drawings, dimensions and scale of each portion are appropriately different from the actual ones, and some portions are schematically illustrated for easy understanding. In addition, the scope of the present disclosure is not limited to the forms unless the present disclosure is particularly limited in the following description.

In the following, for convenience of description, an X-axis, a Y-axis, and a Z-axis that intersect with each other are appropriately used. In the following, one direction along the X-axis is an X1 direction, and a direction opposite to the X1 direction is an X2 direction. In the same manner, directions opposite to each other along the Y-axis are a Y1 direction and a Y2 direction. Further, directions opposite to each other along the Z-axis are a Z1 direction and a Z2 direction.

Here, the X-axis, the Y-axis, and the Z-axis correspond to the coordinate axes of a world coordinate system set in a space in which a robot 2, which will be described below, is installed. Typically, the Z-axis is a vertical axis, and the Z2 direction corresponds to a downward direction in a vertical direction. A base coordinate system based on a position of a base portion 210, which will be described below, of the robot 2 is associated with the world coordinate system by calibration. In the following, for convenience, a case where an operation of the robot 2 is controlled by using the world coordinate system as a robot coordinate system will be illustrated.

The Z-axis may not be the vertical axis. Further, the X-axis, the Y-axis, and the Z-axis are typically orthogonal to each other, but the present disclosure is not limited to this, and the X-axis, the Y-axis, and the Z-axis may not be orthogonal to each other. For example, the X-axis, Y-axis, and Z-axis may intersect with each other at an angle within a range equal to or more than 80° and equal to or less than 100°.

1-1. Overview of Three-Dimensional Object Printing Apparatus

FIG. 1 is a perspective view illustrating an overview of a three-dimensional object printing apparatus 1 according to a first embodiment. The three-dimensional object printing apparatus 1 is an apparatus that prints on a printing region Wa which is a part or an entirety of a surface of a three-dimensional workpiece W by an ink jet method.

The workpiece W has a surface including the printing region Wa, which is a range in which an image is formed. In the example illustrated in FIG. 1, the workpiece W is a hemispherical body, and the surface of the workpiece W is a projecting hemispherical surface. For example, the workpiece W at a time of printing is supported by a structure such as a predetermined setting table, a hand of a robot other than the robot 2, which will be described below, or a conveyor, as needed. A size, a shape, or an installation posture of the workpiece W is not limited to the example illustrated in FIG. 1, and is any size, shape, or installation posture. Meanwhile, when the printing region Wa is a curved surface, effects of the present disclosure, which will be described below, become remarkable. The workpiece W is a certain product, and printing in the printing region Wa is one of a series of steps for manufacturing this product.

As illustrated in FIG. 1, the three-dimensional object printing apparatus 1 includes the robot 2, a head unit 3, a controller 5, and a piping portion 10. Hereinafter, first, the robot 2, the head unit 3, the controller 5, and the piping portion 10 will be briefly described in order.

The robot 2 is a movement mechanism that changes a position and a posture of the head unit 3 in the world coordinate system. In the example illustrated in FIG. 1, the robot 2 is a so-called 6-axis vertical articulated robot.

As illustrated in FIG. 1, the robot 2 has the base portion 210 and an arm portion 220.

The base portion 210 is a base that supports the arm portion 220. In the example illustrated in FIG. 1, the base portion 210 is fixed to a floor surface facing the Z1 direction or an installation surface such as a base by screwing or the like. The installation surface to which the base portion 210 is fixed may be a surface facing in any direction, is not limited to the example illustrated in FIG. 1, and may be, for example, a surface provided by a wall, a ceiling, a movable trolley, or the like.

The arm portion 220 is a 6-axis robot arm having a base end attached to the base portion 210 and a tip that changes a position and a posture three-dimensionally with respect to the base end. Specifically, the arm portion 220 has arms 221, 222, 223, 224, 225, and 226 also referred to as links, which are coupled in this order.

The arm 221 is rotatably coupled to the base portion 210 around a rotation axis O1 via a joint 230_1. The arm 222 is rotatably coupled to the arm 221 around a rotation axis O2 via a joint 230_2. The arm 223 is rotatably coupled to the arm 222 around a rotation axis O3 via a joint 230_3. The arm 224 is rotatably coupled to the arm 223 around a rotation axis O4 via a joint 230_4. The arm 225 is rotatably coupled to the arm 224 around a rotation axis O5 via a joint 230_5. The arm 226 is rotatably coupled to the arm 225 around a rotation axis O6 via a joint 230_6.

Each of the joints 230_1 to 230_6 is a mechanism for rotatably coupling one of two adjacent members of the base portion 210 and the arms 221 to 226 to the other. In the following, each of the joints 230_1 to 230_6 may be referred to as a "joint 230".

Although not illustrated in FIG. 1, each of the joints 230_1 to 230_6 is provided with a drive mechanism for rotating one of the two adjacent members corresponding to each other to the other. The drive mechanism includes, for example, a motor that generates a drive force for the rotation, a speed reducer that decelerates and outputs the drive force, an encoder such as a rotary encoder that detects the operation amount such as an angle of the rotation, and the like. An aggregation of the drive mechanisms of the joints 230_1 to 230_6 corresponds to an arm drive mechanism 2*a* illustrated in FIG. 2, which will be described below.

The rotation axis O1 is an axis perpendicular to the installation surface, which is not illustrated, to which the base portion 210 is fixed. The rotation axis O2 is an axis perpendicular to the rotation axis O1. The rotation axis O3 is an axis parallel with the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only a case where an angle formed by the two rotation axes is strictly 90°, but also a case where the angle formed by the two rotation axes deviates within a range of approximately 90° to ±5°. In the same manner, "parallel" includes not only a case where the two rotation axes are strictly parallel with each other, but also a case where one of the two rotation axes is inclined within a range of approximately ±5° with respect to the other.

The head unit 3 is mounted on the arm 226 located at the most tip among the arms 221 to 226 of the above robot 2, in a state of being fixed by screwing or the like as an end effector.

The head unit 3 is an assembly having a head 3*a* that ejects an ink, which is an example of a "liquid", toward the workpiece W. The surface of the workpiece W is made of, for example, a material that is non-absorbent to inks. The material non-absorbent with respect to inks is a material that does not absorb the inks. For example, the material which is non-absorbent to inks is plastic and inorganic compound such as metals or glass. Meanwhile, the surface of the workpiece W may not be made of a material that is non-absorbent to inks.

In the present embodiment, the head unit 3 has not only the head 3*a* but also a pressure regulating valve 3*b* and an energy emitting portion 3*c*. Details of the head unit 3 will be described below with reference to FIG. 3.

The ink is not particularly limited, and includes, for example, an aqueous ink in which a coloring material such as a dye or a pigment is dissolved in an aqueous solvent, a curable ink using a curable resin such as an ultraviolet curable type, a solvent-based ink in which a coloring material such as a dye or a pigment is dissolved in an organic solvent, and the like. Among the inks, the curable ink is preferably used. The curable ink is not particularly limited, and may have, for example, any of a thermosetting type, a photocurable type, a radiation curable type, an electron beam curable type, and the like, and a photocurable type such as an ultraviolet curable type is preferable. The ink is not limited to the solution, and may be an ink in which a coloring material or the like is dispersed as a dispersant in a dispersion medium. Further, the ink is not limited to an ink containing a coloring material, and may be, for example, an ink containing conductive particles such as metal particles for forming wiring or the like as a dispersant, a clear ink, or a treatment liquid for surface treatment of the workpiece W.

Each of the piping portion 10 and a wiring portion, which is not illustrated, is coupled to the head unit 3. The piping portion 10 is a piping or a piping group that supplies the ink from an ink tank, which is not illustrated, to the head unit 3. The wiring portion is a wiring or a wiring group for supplying an electric signal for driving the head 3*a*. The routing of the wiring portion may have the same manner as or different from the routing of the piping portion 10.

The controller 5 is a robot controller that controls the drive of the robot 2. The computer 7 is a computer such as a desktop type or a notebook type in which a program is installed, and controls the drive of the head unit 3. Hereinafter, an electrical configuration of the three-dimensional object printing apparatus 1 will be described with reference to FIG. 2, including a detailed description of the controller 5 and computer 7.

1-2. Electrical Configuration of Three-Dimensional Object Printing Apparatus

FIG. 2 is a block diagram illustrating an electrical configuration of the three-dimensional object printing apparatus 1 according to the first embodiment. In FIG. 2, among components of the three-dimensional object printing apparatus 1, electrical components are illustrated. As illustrated in FIG. 2, in addition to the components illustrated in FIG. 1 described above, the three-dimensional object printing apparatus 1 includes a control module 6 that is communicably connected to the controller 5 and a computer 7 that is communicably connected to the controller 5 and the control module 6. The controller 5, the control module 6, and the computer 7 may be collectively referred to as, for example, a "control portion".

Each electrical component illustrated in FIG. 2 may be appropriately divided, a part thereof may be included in another component, or may be integrally formed with the other component. For example, a part or the entirety of the functions of the controller 5 or the control module 6 may be realized by the computer 7, or may be realized by another external apparatus such as a personal computer (PC) coupled to the controller 5 via a network such as a local area network (LAN) or the Internet.

The controller 5 has a function of controlling the drive of the robot 2 and a function of generating a signal D3 for synchronizing an ink ejection operation of the head unit 3 with the operation of the robot 2. The controller 5 has a storage circuit 5*a* and a processing circuit 5*b*.

The storage circuit 5*a* stores various programs to be executed by the processing circuit 5*b* and various types of data to be processed by the processing circuit 5*b*. The storage circuit 5*a* includes, for example, one or both semiconductor memories of a volatile memory such as a random access memory (RAM) and a non-volatile memory such as a read only memory (ROM), an electrically erasable programmable read-only memory (EEPROM) or a programmable ROM (PROM). A part or all of the storage circuit 5*a* may be included in the processing circuit 5*b*.

Printing path information Da is recorded in the storage circuit 5*a*. The printing path information Da is information which is used for controlling the operation of the robot 2 and indicates a position and a posture of the head 3*a* in a path along which the head 3*a* is to be moved when a printing operation is executed. The printing path information Da includes information indicating a change in relative position of the head 3*a* with respect to the workpiece W when the printing operation is executed, and information indicating a change in relative posture of the head 3*a* with respect to the workpiece W when the printing operation is executed. The printing path information Da is represented by using, for example, the coordinate values of the workpiece coordinate system, the base coordinate system, or the world coordinate system. When the printing path information Da is represented by using a coordinate value of the workpiece coordinate system, the printing path information Da is used for controlling the operation of the robot 2 after conversion from the coordinate value of the workpiece coordinate system to a coordinate value of the base coordinate system or the world coordinate system.

The processing circuit 5*b* controls an operation of the arm drive mechanism 2*a* of the robot 2 based on the printing path information Da, and generates the signal D3. The processing circuit 5*b* includes, for example, one or more processors such as a central processing unit (CPU). The processing circuit 5*b* may include a programmable logic device such as a field-programmable gate array (FPGA), instead of the CPU or in addition to the CPU.

Here, the arm drive mechanism 2*a* is an aggregation of the drive mechanisms of the joints 230_1 to 230_6 described above, and includes a motor for driving the joint of the robot 2 and encoders 241_1 to 241_6 that measure a rotation angle of the joint of the robot 2, for each joint 230.

The processing circuit 5*b* performs an inverse kinematics calculation, which is an arithmetic operation for converting the printing path information Da into the operation amount such as a rotation angle and a rotation speed of each joint 230 of the robot 2. The processing circuit 5*b* outputs control signals Sk_1 to Sk_6 based on output signals D1_1 to D1_6 from each of the encoders 241_1 to 241_6 of the arm drive mechanism 2*a* such that the operation amount such as the actual rotation angle and the rotation speed of each joint 230 becomes the arithmetic operation result described above based on the printing path information Da. Each of the control signal Sk_1 to the control signal Sk_6 corresponds to each of the joint 230_1 to the joint 230_6, and controls the drive of the motor provided in the corresponding joint 230. Each of the output signal D1_1 to the output signal D1_6 corresponds to each of the encoder 241_1 to the encoder 241_6. Hereinafter, each of the output signal D1_1 to the output signal D1_6 may be collectively referred to as an output signal D1. The control signals Sk_1 to Sk_6 are signals for controlling the drive of the motor of the arm drive mechanism 2*a*. Here, the control signals Sk_1 to Sk_6 are corrected by the processing circuit 5*b* based on an output from a distance sensor, which is not illustrated, as needed.

Further, the processing circuit 5*b* generates the signal D3, based on the output signal D1 from at least one of the encoders 241_1 to 241_6 included in the arm drive mechanism 2*a*. For example, the processing circuit 5*b* generates a trigger signal including a pulse at a timing at which the output signal D1 from one of the plurality of encoders becomes a predetermined value as the signal D3.

The control module 6 is a circuit that controls an ink ejection operation in the head unit 3 based on the signal D3 output from the controller 5 and print data Img from the computer 7. The print data Img is information indicating an image to be printed on the workpiece W along each of a plurality of paths indicated by the printing path information Da. The control module 6 includes a timing signal generation circuit 6*a*, a power supply circuit 6*b*, a control circuit 6*c*, and a drive signal generation circuit 6*d*.

The timing signal generation circuit 6*a* generates a timing signal PTS based on the signal D3. The timing signal generation circuit 6*a* is configured with, for example, a timer that starts generation of the timing signal PTS by using detection of the signal D3 as a trigger.

The power supply circuit 6*b* receives power from a commercial power supply, which is not illustrated, to generate various predetermined potentials. The various generated potentials are appropriately supplied to each portion of the control module 6 and the head unit 3. For example, the power supply circuit 6*b* generates a power supply potential VHV and an offset potential VBS. The offset potential VBS is supplied to the head unit 3. Further, the power supply potential VHV is supplied to the drive signal generation circuit 6*d*.

The control circuit 6*c* generates a control signal SI, a waveform designation signal dCom, a latch signal LAT, a clock signal CLK, and a change signal CNG, based on the timing signal PTS. These signals are synchronized with the timing signal PTS. Among these signals, the waveform designation signal dCom is input to the drive signal generation circuit 6*d*, and the other signals are input to the switch circuit 3*e* of the head unit 3.

The control signal SI is a digital signal for designating an operation state of a piezoelectric element 311 included in the head 3*a* of the head unit 3. Specifically, the control signal SI is a signal for designating whether or not to supply a drive signal Com, which will be described below, to the piezoelectric element 311 based on the print data Img. With this designation, for example, whether or not to eject inks from a nozzle N corresponding to the piezoelectric element 311 is designated, and the amount of ink ejected from the nozzle N is designated. The waveform designation signal dCom is a digital signal for defining a waveform of the drive signal Com. The latch signal LAT and the change signal CNG are signals for defining an ejection timing of the ink from the nozzle N, in combination with the control signal SI, by defining a drive timing of the piezoelectric element 311. The clock signal CLK is a reference clock signal synchronized with the timing signal PTS.

The above control circuit 6*c* includes, for example, one or more processors such as a CPU. The control circuit 6*c* may include a programmable logic device such as an FPGA instead of the CPU or in addition to the CPU.

The drive signal generation circuit 6*d* is a circuit that generates the drive signal Com for driving each drive element included in the head 3*a* of the head unit 3. Specifically, the drive signal generation circuit 6*d* includes, for example, a DA conversion circuit and an amplifier circuit. In the drive signal generation circuit 6*d*, the DA conversion circuit converts the waveform designation signal dCom from the control circuit 6*c* from a digital signal to an analog signal, and the amplifier circuit uses the power supply potential VHV from the power supply circuit 6*b* to amplify the analog signal and generate the drive signal Com. Here, among waveforms included in the drive signal Com, a signal of a waveform actually supplied to the piezoelectric element 311 is a drive pulse PD. The drive pulse PD is supplied from the drive signal generation circuit 6*d* to the piezoelectric element 311, via the switch circuit 3*e* of the head unit 3.

Here, the switch circuit 3*e* is a circuit including a switching element that switches whether or not to supply at least a part of the waveform included in the drive signal Com as the drive pulse PD based on the control signal SI.

The computer 7 has a function of generating the printing path information Da, a function of supplying information such as the printing path information Da to the controller 5, and a function of supplying information such as the print data Img to the control module 6. For example, the computer 7 generates the printing path information Da based on workpiece information indicating a position and a shape of the workpiece W, and provides the generated printing path information Da to the controller 5. The computer 7 is, for example, a PC. The computer 7 functions as a user interface of the three-dimensional object printing apparatus 1, and a user of the three-dimensional object printing apparatus 1 causes the robot 2 and the head unit 3 to execute a plurality of printing operations including a first printing operation and a second printing operation, which will be described below, via the controller 5 and the control module 6. The computer 7 further has a function of controlling a drive of the energy emitting portion 3*c*.

As described above, by controlling the drive of the robot 2 based on the printing path information Da and controlling the drive of the head 3*a* based on the print data Img and the signal D3, the plurality of printing operations are performed. In each printing operation of the plurality of printing operations, while the robot 2 changes the position and the posture of the head 3*a* based on the printing path information Da, the head 3*a* ejects inks from the head 3*a* toward the workpiece W at an appropriate timing based on the print data Img and the signal D3. Thus, an image based on the print data Img is formed at the workpiece W.

1-3. Configuration of Head Unit

Figure 3:
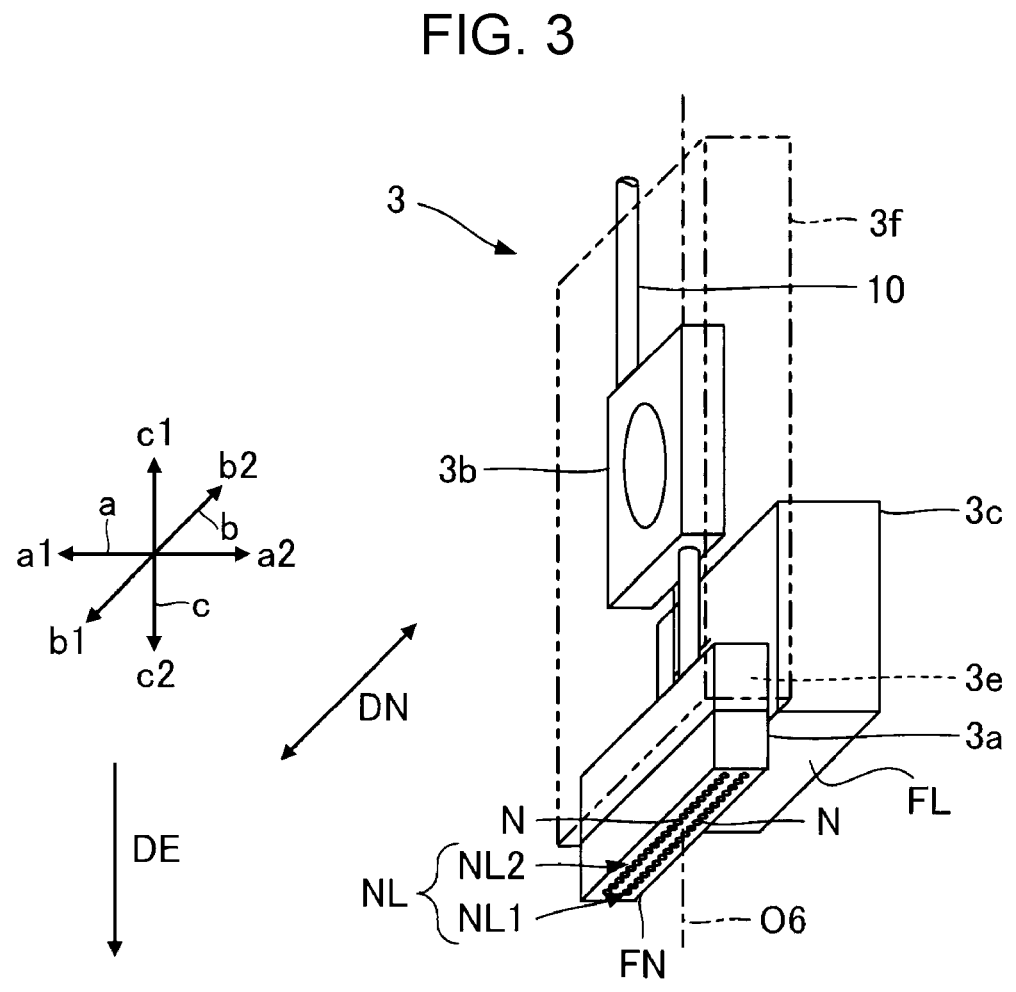

FIG. 3 is a perspective view illustrating a schematic configuration of the head unit 3. In the following description, for convenience, an a-axis, a b-axis, and a c-axis that intersect with each other will be appropriately used. Further, in the following description, one direction along the a-axis is an a1 direction, and a direction opposite to the a1 direction is an a2 direction. In the same manner, directions opposite to each other along the b-axis are a b1 direction and a b2 direction. Further, directions opposite to each other along the c-axis are a c1 direction and a c2 direction.

Here, the a-axis, the b-axis, and the c-axis correspond to coordinate axes of a tool coordinate system set in the head unit 3, and relative positions and relationships of postures with the world coordinate system or the robot coordinate system described above are changed by the operation of the robot 2 described above. In the example illustrated in FIG. 3, the c-axis is an axis parallel with the rotation axis O6 described above. The a-axis, the b-axis, and the c-axis are typically orthogonal to each other without being limited thereto, and may intersect at an angle within a range of 80° or more and 100° or less, for example. The tool coordinate system and the base coordinate system or the robot coordinate system are associated with each other by calibration.

As described above, the head unit 3 has the head 3*a*, the pressure regulating valve 3*b*, and the energy emitting portion 3*c*. The head 3*a*, the pressure regulating valve 3*b*, and the energy emitting portion 3*c* are supported by a support body 3*f* illustrated by a two-dot chain line in FIG. 3. In the example illustrated in FIG. 3, the number of each of the head 3*a* and the pressure regulating valve 3*b* included in the head unit 3 is one. Meanwhile, the number is not limited to the example illustrated in FIG. 3, and may be equal to or more than 2. Further, an installation position of the pressure regulating valve 3*b* is not limited to the arm 226, and may be, for example, another arm or the like, or may be a fixed position with respect to the base portion 210.

The support body 3*f* is made of, for example, a metal material or the like, and is a substantially rigid body. In FIG. 3, the support body 3*f* has a planar box shape, and a shape of the support body 3*f* is not particularly limited and is any shape.

The above support body 3*f* is mounted to the arm 226 described above. Therefore, the head 3*a*, the pressure regulating valve 3*b*, and the energy emitting portion 3*c* are collectively supported on the arm 226 by the support body 3*f*. Therefore, each relative position of the head 3*a*, the pressure regulating valve 3*b*, and the energy emitting portion 3*c* with respect to the arm 226 is fixed. In the example illustrated in FIG. 3, the pressure regulating valve 3*b* is disposed at a position in the c1 direction with the head 3*a*. The energy emitting portion 3*c* is disposed at a position in the a2 direction with respect to the head 3*a*.

The head 3*a* has a nozzle surface FN and a plurality of nozzles N that are opened on the nozzle surface FN. The plurality of nozzles N are divided into a first nozzle array NL1 and a second nozzle array NL2 aligned apart from each other in a direction along the a-axis. Each of the first nozzle array NL1 and the second nozzle array NL2 is a set of the plurality of nozzles N linearly arrayed in a nozzle array direction DN which is a direction along the b-axis. Here, elements related to each of the nozzles N of the first nozzle array NL1 and elements related to each of the nozzles N of the second nozzle array NL2 in the head 3*a* are configured to be substantially symmetrical with each other in a direction along the a-axis.

Meanwhile, positions of the plurality of nozzles N in the first nozzle array NL1 and the plurality of nozzles N in the second nozzle array NL2 in the direction along the b-axis may or may not coincide with each other. The elements related to each nozzle N of one of the first nozzle array NL1 and the second nozzle array NL2 may be omitted. In the following, a configuration in which the positions of the plurality of nozzles N in the first nozzle array NL1 and the plurality of nozzles N in the second nozzle array NL2 in the direction along the b-axis coincide with each other will be described.

Although not illustrated, the head 3*a* has the piezoelectric element 311 and a cavity for accommodating inks, for each nozzle N. Here, the piezoelectric element 311 ejects the ink from the nozzle N corresponding to the cavity in an ejection direction DE by changing a pressure of the cavity corresponding to the piezoelectric element 311, and a liquid droplet is landed on the surface of the workpiece W. Such a head 3*a* can be obtained, for example, by bonding a plurality of substrates such as a silicon substrate appropriately processed by etching or the like with an adhesive or the like. As a drive element for ejecting the ink from the nozzle N, a heater that heats the ink in the cavity may be used, instead of the piezoelectric element 311.

Ink is supplied to the above head 3*a* from an ink tank, which is not illustrated, via the piping portion 10. Here, the piping portion 10 is coupled to the head 3*a* via the pressure regulating valve 3*b*.

The pressure regulating valve 3*b* is a valve mechanism that is opened and closed according to a pressure of the ink in the head 3*a*. By this opening and closing, the pressure of the ink in the head 3*a* is maintained at a negative pressure within a predetermined range even when a positional relationship between the head 3*a* and the ink tank described above is changed. Therefore, a meniscus of the ink formed at the nozzle N of the head 3*a* is stabilized. As a result, it is possible to prevent air bubbles from entering the nozzle N, and the ink from overflowing from the nozzle N. Further, the ink from the pressure regulating valve 3*b* is appropriately distributed to a plurality of locations of the head 3*a* via a branch flow path, which is not illustrated. Here, the ink from the ink tank is supplied to the pressure regulating valve 3*b* at a predetermined pressure by a pump or the like.

The energy emitting portion 3*c* emits energy such as light, heat, an electron beam, or radiation for curing or solidifying the ink on the workpiece W. For example, when the ink has ultraviolet curability, the energy emitting portion 3*c* is configured with a light emitting element such as a light emitting diode (LED) that emits ultraviolet rays. Further, the energy emitting portion 3*c* may appropriately have an optical component such as a lens for adjusting an emitting direction or an emitting range of the energy.

As illustrated in FIG. 3, since the head unit 3 has the head 3*a*, the robot 2 changes the relative position and posture between the workpiece W and the head 3*a*. The changing of the relative position and posture between the workpiece W and the head 3*a* means changing a position and a posture of the head 3*a* while the workpiece W is fixed and changing a position and a posture of the workpiece W while the head 3*a* is fixed. Further, the position and the posture of the workpiece W may be changeable, and the position and the posture of the head 3*a* may be changeable. In the present embodiment, the robot 2 changes the position and the posture of the head 3*a* while fixing the workpiece W. The robot 2 is an example of a "movement mechanism".

1-4. Printing Operation on Curved Surface

When an image is formed in the printing region Wa, which is a curved surface, the three-dimensional object printing apparatus 1 divides the printing region Wa into a plurality of band regions BR, and forms a partial image in each of the band regions BR to form the image on the printing region Wa. The band region BR is a strip-shaped region. When printing on the printing region Wa, which is a curved surface, it is necessary to change the width of the band region BR according to the longitudinal direction of the band region BR. In other words, a shape of the band region BR is not a rectangular shape. The shape that is not the rectangular shape is, for example, a substantially elliptical shape, a rhomboidal shape, a trapezoidal shape, or the like. The reason for changing the width of the band region BR is that a distance between the nozzle N of the head 3*a* and the printing region Wa is to be kept within a predetermined range since an air flow is generated by changing the relative position and posture between the workpiece W and the head 3*a* and landing accuracy of liquid droplets is decreased due to an influence of the air flow described above as the distance between the nozzle N of the head 3*a* and the printing region Wa is larger.

Meanwhile, when the shape of the band region BR is not a rectangular shape, a quality of an image formed in the printing region Wa may deteriorate when a printing start position of the band region BR deviates from an ideal start position. In order to describe the deterioration of the image quality, a band region BR-A, which is a reference example, will be described with reference to FIGS. 4 and 5.

Figure 4:
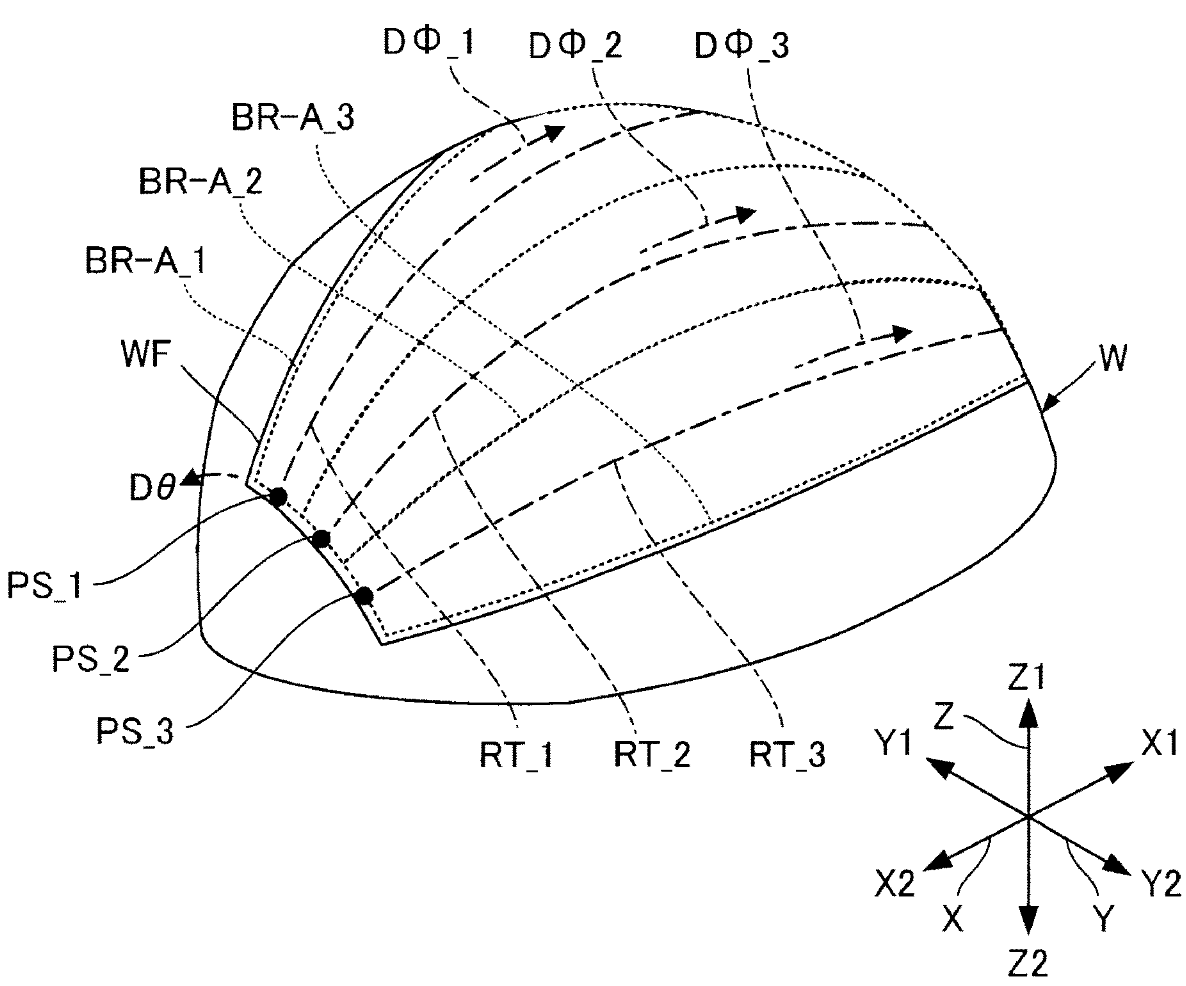
FIG. 4 is a diagram describing a band region.
Figure 5:
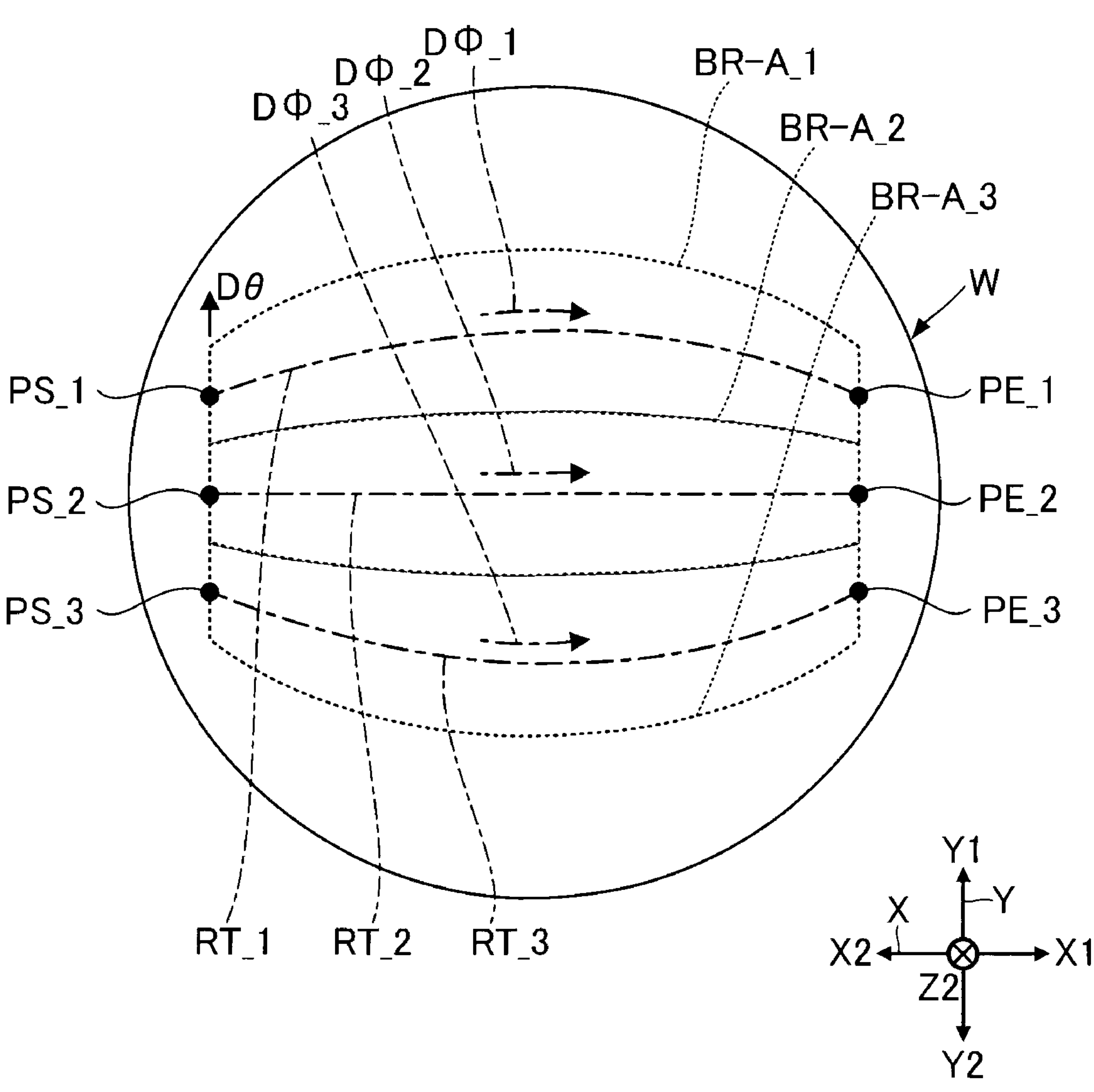
FIG. 5 is a diagram describing the band region.

FIGS. 4 and 5 are diagrams describing the band region BR-A which is a reference example. FIG. 4 illustrates a perspective view of the workpiece W, and FIG. 5 illustrates a plan view of the workpiece W viewed in the Z2 direction. In the examples in FIGS. 4 and 5, the printing region Wa is divided into a band region BR-A_1, a band region BR-A_2, and a band region BR-A_3. Hereinafter, without distinguishing each of the band region BR-A_1, the band region BR-A_2, and the band region BR-A_3, the band region BR-A_1, the band region BR-A_2, and the band region BR-A_3 may be collectively referred to as the band region BR-A. The number of the band regions BR-A is not limited to three, and may be two or more. In the examples in FIGS. 4 and 5, among the band regions BR-A_1, BR-A_2, and BR-A_3, the band region BR-A_1 is located foremost in the Y1 direction, and the band region BR-A_3 is located foremost in the Y2 direction. The two adjacent band regions BR-A do not overlap each other. In FIG. 4, as a display for convenience, the band region BR-A is displayed slightly smaller such that a contour of the band region BR-A does not overlap with a contour of the printing region Wa.

When viewed in the Z2 direction, the band region BR-A is a substantially elliptical region extending along the X-axis. That is, a longitudinal direction of the band region BR-A is a direction along the X-axis, and a lateral direction of the band region BR-A is a direction along the Y-axis. A width of the band region BR-A in the world coordinate system is a length in a direction orthogonal to a main scanning direction DΦ, which will be described below, and along the surface of the workpiece W. Hereinafter, the width of the band region BR-A in the direction along the Y-axis will be simply referred to as the width of the band region BR-A. Regarding the specific shape of the band region BR-A, a width at a center of the band region BR-A on the X-axis is the largest, and the width of the band region BR-A becomes smaller toward the X2 direction or the X1 direction.

As illustrated in FIGS. 4 and 5, a partial image is formed in a band region BR-A_1 by ejecting inks from the head 3*a* while the head 3*a* is moved along a path RT_1. More specifically, the fact that the head 3*a* is moved along any one path means that the robot 2 operates such that a tool center point set in the vicinity of the head 3*a* is moved along the path. The tool center point is a virtual reference point representing the head 3*a*, and is set at, for example, a position moved along the ejection direction DE by approximately several mm from a center or a center of gravity of the nozzle array NL provided on the nozzle surface FN. Further, a partial image is formed in the band region BR-A_2 by ejecting the ink from the head 3*a* while the head 3*a* is moved along a path RT_2. Further, a partial image is formed in the band region BR-A_3 by ejecting the ink from the head 3*a* while the head 3*a* is moved along the path RT_3.

The path RT_1 is a path from a start position PS_1 to an end position PE_1. The path RT_2 is a path from a start position PS_2 to an end position PE_2. The path RT_3 is a path from a start position PS_3 to an end position PE_3. As illustrated in FIG. 5, when viewed in the Z2 direction, the path RT_2 is a straight line having a start point and an end point. Meanwhile, the path RT_1 and the path RT_3 are curves having a start point and an end point. When viewed in the Z2 direction, main scanning directions DΦ_1, DΦ_2, and DΦ_3 are directions substantially from the X2 direction to the X1 direction along the surface of the workpiece W. The main scanning direction DΦ_1 is a direction defined by the path RT_1, the main scanning direction DΦ_2 is a direction defined by the path RT_2, and the main scanning direction DΦ_3 is a direction defined by the path RT_3.

In the following description, each of the path RT_1, the path RT_2, and the path RT_3 may be collectively referred to as a path RT without distinguishing the path RT_1, the path RT_2, and the path RT_3. In the same manner, without distinguishing each of the main scanning direction DΦ_1, the main scanning direction DΦ_2, and the main scanning direction DΦ_3, the main scanning direction DΦ_1, the main scanning direction DΦ_2, and the main scanning direction DΦ_3 may be collectively referred to as a main scanning direction DΦ. In the same manner, without distinguishing each of the start position PS_1, the start position PS_2, and the start position PS_3, the start position PS_1, the start position PS_2, and the start position PS_3 may be collectively referred to as a start position PS. The main scanning direction DΦ_1 is a longitudinal direction of the band region BR_1 and is a direction along the path RT_1, and the direction is constantly changed. The main scanning direction DΦ_1 can be said to be a direction in which a relative movement distance of the head 3*a* is largest in a printing operation on the band region BR_1. The main scanning direction DΦ_2 is a direction along the path RT_2, and the direction is constantly changed. The main scanning direction DΦ_2 can be said to be a direction in which the relative movement distance of the head 3*a* is largest in the printing operation on the band region BR_2. The main scanning direction DΦ_3 is a direction along the path RT_3, and the direction is constantly changed. The main scanning direction DΦ_3 can be said to be a direction in which the relative movement distance of the head 3*a* is largest in the printing operation on the band region BR_3. The main scanning direction DΦ defines a vector by a start point and an end point of the relative movement of the head 3*a* for each printing operation on each band region BR, and can be said to be a direction parallel to a vector obtained by combining these vectors. Therefore, the main scanning direction DΦ is a concept indicating a direction substantially equal to the main scanning direction DΦ_1 and the main scanning direction DΦ_2. As can be understood from FIG. 6, in the present embodiment, the main scanning direction DΦ is a direction parallel to the X-axis.

The start position PS is located at an end of the path RT in the X2 direction, and may be located at an end of the path RT in the X1 direction. Further, in the example in FIG. 4, a so-called unidirectional printing operation in which the head 3*a* ejects inks from the head 3*a* while being moved from the X2 direction to the X1 direction is executed. Meanwhile, the present disclosure is not limited thereto. For example, in a certain path RT, a so-called bidirectional printing operation in which the head 3*a* ejects the inks while being moved from the X2 direction to the X1 direction and the head 3*a* ejects the inks while being moved from the X1 direction to the X2 direction in the other path RT may be executed.

In the following description, a direction orthogonal to the main scanning direction DΦ is referred to as a sub-scanning direction Dθ. More strictly, the sub-scanning direction Dθ is a direction that is orthogonal to the main scanning direction DΦ, and is along the printing region Wa. In the present embodiment, the sub-scanning direction Dθ is a direction along the surface of the workpiece W to rotate around the X-axis, and when viewed in the direction along the Z-axis, as illustrated in FIG. 5, the sub-scanning direction Dθ is a direction along the Y-axis. As illustrated in FIGS. 4 and 5, the start position PS_1, the start position PS_2, and the start position PS_3 are the same position when viewed in the sub-scanning direction Dθ. Meanwhile, when the start position PS_1, the start position PS_2, and the start position PS_3 are not the same position when viewed in the sub-scanning direction Dθ, a quality of the image formed in the printing region Wa deteriorates. An example in which the start position PS_1, the start position PS_2, and the start position PS_3 are not the same position when viewed in the sub-scanning direction Dθ will be described with reference to FIG. 6.

Figure 6:
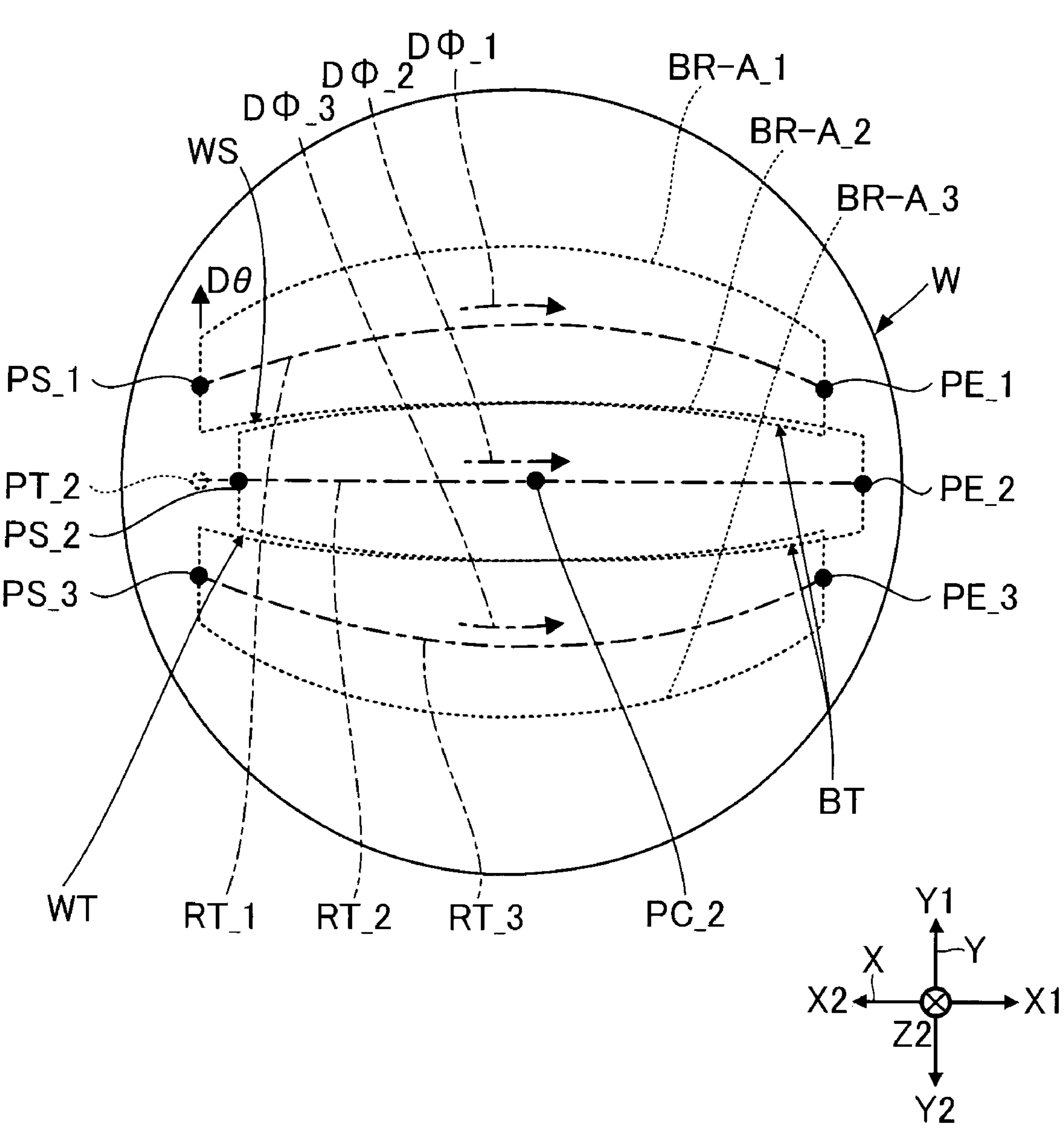
FIG. 6 is a diagram illustrating an example in which a quality of an image deteriorates when a position of a start position is different.

FIG. 6 is a diagram illustrating an example in which a quality of an image deteriorates when the positions of the start positions PS are different from each other. The example in FIG. 6 illustrates an example in which the start position PS_2 deviates from an original start position PT_2 in the path RT_2 in the X1 direction when viewed in the Z2 direction. As a result of the deviation of the start position PS_2 in the X1 direction, the end position PE_2 also deviates in the X1 direction and the band region BR-A_2 also deviates in the X1 direction. Further, as the result of the deviation of the start position PS_2 in the X1 direction, a white stripe WT is generated at an end portion in the X2 direction and a black stripe BT is generated at an end portion in the X1 direction, so that the quality of the image formed in the printing region Wa deteriorates. The white stripe WT is a minute gap to which the ink is not attached. The black stripe BT is a dark stripe generated by overlapping of the inks due to the overlapping of adjacent band regions BR. The white stripe WT and the black stripe BT are generated along the main scanning direction DΦ. In the example in FIG. 6, the two white stripes WT are generated. The first white stripe WT is generated from an end of the band region BR-A_2 in the X2 direction to the vicinity of the position PC_2 which is a center of the band region BR-A_2, at the end portion of the band region BR-A_2 in the Y1 direction. The second white stripe WT is generated from the end of the band region BR-A_2 in the X2 direction to the vicinity of the position PC_2, at the end portion of the band region BR-A_2 in the Y2 direction. In the same manner, in the example in FIG. 6, the two black stripes BT are generated. The first black stripe BT is generated from an end of the band region BR-A_2 in the X1 direction to the vicinity of the position PC_2, at the end portion of the band region BR-A_2 in the Y1 direction. The second black stripe BT is generated from the end of the band region BR-A_2 in the X1 direction to the vicinity of the position PC_2, at the end portion of the band region BR-A_2 in the Y2 direction.

The reason why the white stripe WT and the black stripe BT are generated is due to the shape of the band region BR-A. As described above, regarding the shape of the band region BR-A, the width of the center of the band region BR-A on the X-axis is the longest, and the width of the band region BR-A becomes smaller toward the X2 direction and the X1 direction. Therefore, when the band region BR-A deviates along the X-axis, the white stripe WT is generated at a portion at which a gap occurs between the adjacent band regions BR-A along the Y-axis, and the black stripe BT is generated at a portion at which the adjacent band regions BR-A along the Y-axis overlap with each other.

When the shape of the band region BR is a rectangular shape and the printing region Wa is a plane and the start position of the band region deviates, the influence of the deviation is limited only to the main scanning direction, specifically, to a longitudinal direction of the rectangular shape, so the white stripe WT and black stripe BT are not generated.

Further, even when the start position PS_1, the start position PS_2, and the start position PS_3 are the same position when viewed in the sub-scanning direction Dθ, the quality of the image formed in the printing region Wa may deteriorate.

Figure 7:
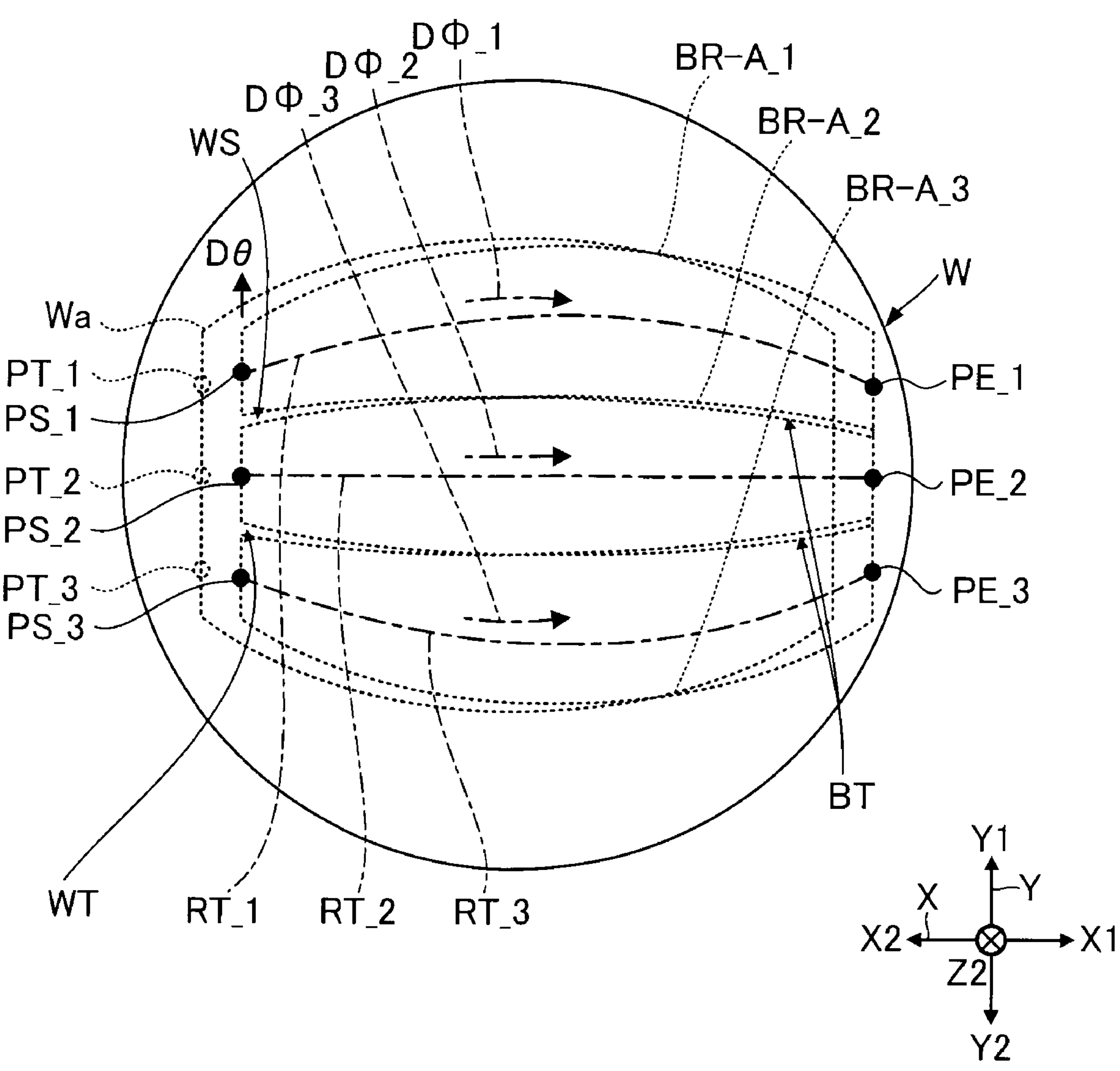
FIG. 7 is a diagram illustrating an example in which the quality of the image deteriorates when the position of the start position is the same.

FIG. 7 is a diagram illustrating an example in which a quality of an image deteriorates when the positions of the start positions PS are the same as each other. In the example in FIG. 7, an example in which the start position PS_1 deviates from an original start position PT_1 in the path RT_1 in the X1 direction, the start position PS_2 deviates from the original start position PT_2 in the path RT_2 in the X1 direction, and the start position PS_3 deviates from the original start position PT_3 in the path RT_3 in the X1 direction is illustrated. As a result of the deviations of the start position PS_1, the start position PS_2, and the start position PS_3 in the X1 direction, the positions of the start position PS_1, the start position PS_2, and the start position PS_3 when viewed in the sub-scanning direction Dθ are the same. Meanwhile, since the printing region Wa is a curved surface, as illustrated in FIG. 7, defects such as the white stripe WT and the black stripe BT may occur. Such defects are remarkable in the workpiece W in which the printing region Wa is a curved surface and the printing region Wa is curved when viewed in the main scanning direction DΦ.

As described above, the white stripe WT and the black stripe BT are generated at an end portion in the X1 direction and an end portion in the X2 direction. Therefore, in the present embodiment, by overlapping the parts of the two adjacent band regions BR at the end portion in the X1 direction and the end portion in the X2 direction, the conspicuousness of the white stripe WT and the black stripe BT is reduced. In the center portion of the band region BR in a direction along the X-axis, the parts of the two adjacent band regions BR may or may not overlap with each other. In the present embodiment, the center portion of the band region BR in the direction along the X-axis will be described as an aspect in which the parts of the two adjacent band regions BR overlap with each other. The band region BR of the present embodiment will be described with reference to FIGS. 8 and 9.

Figure 8:
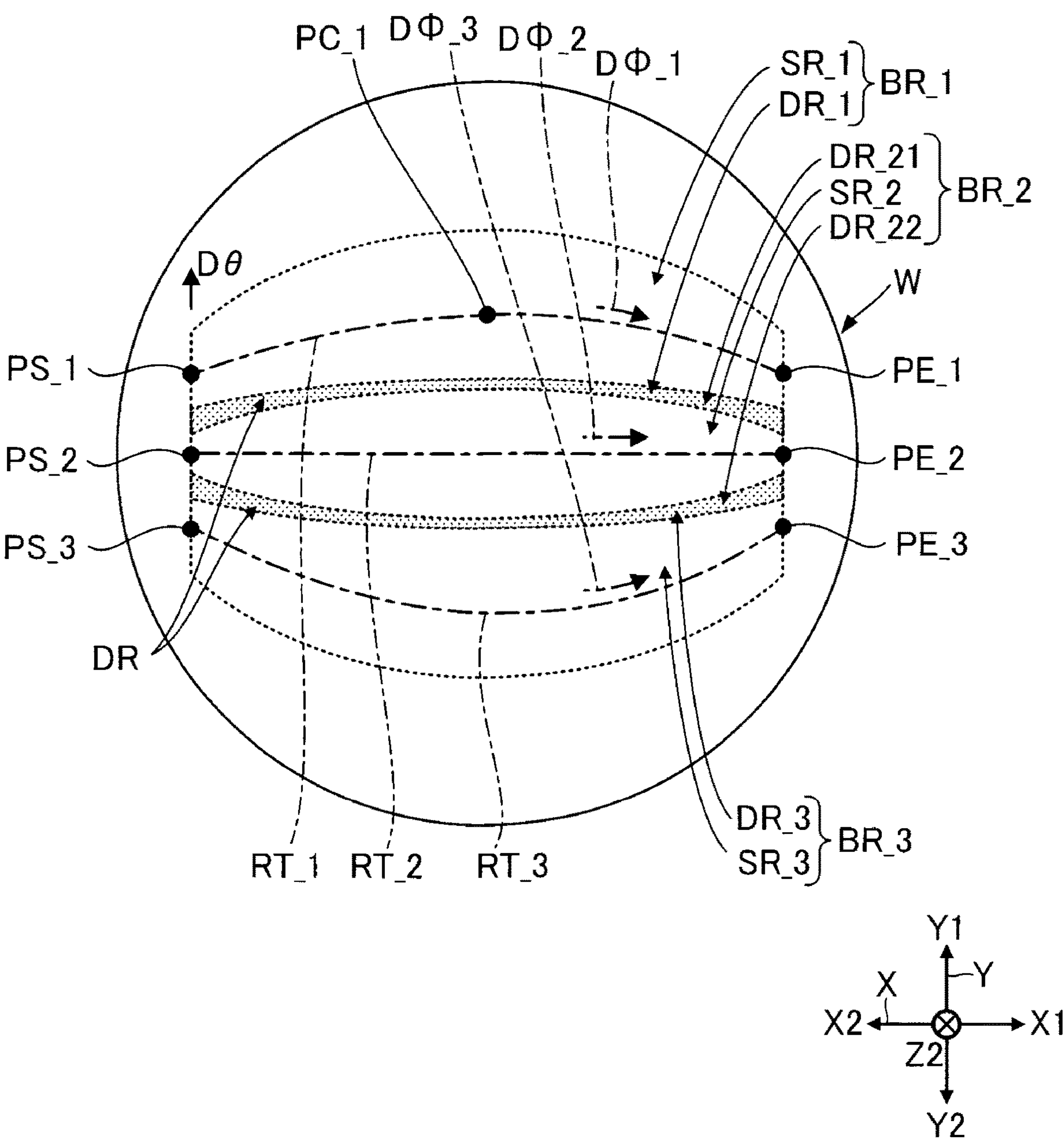
FIG. 8 is a diagram describing a band region.
Figure 9:
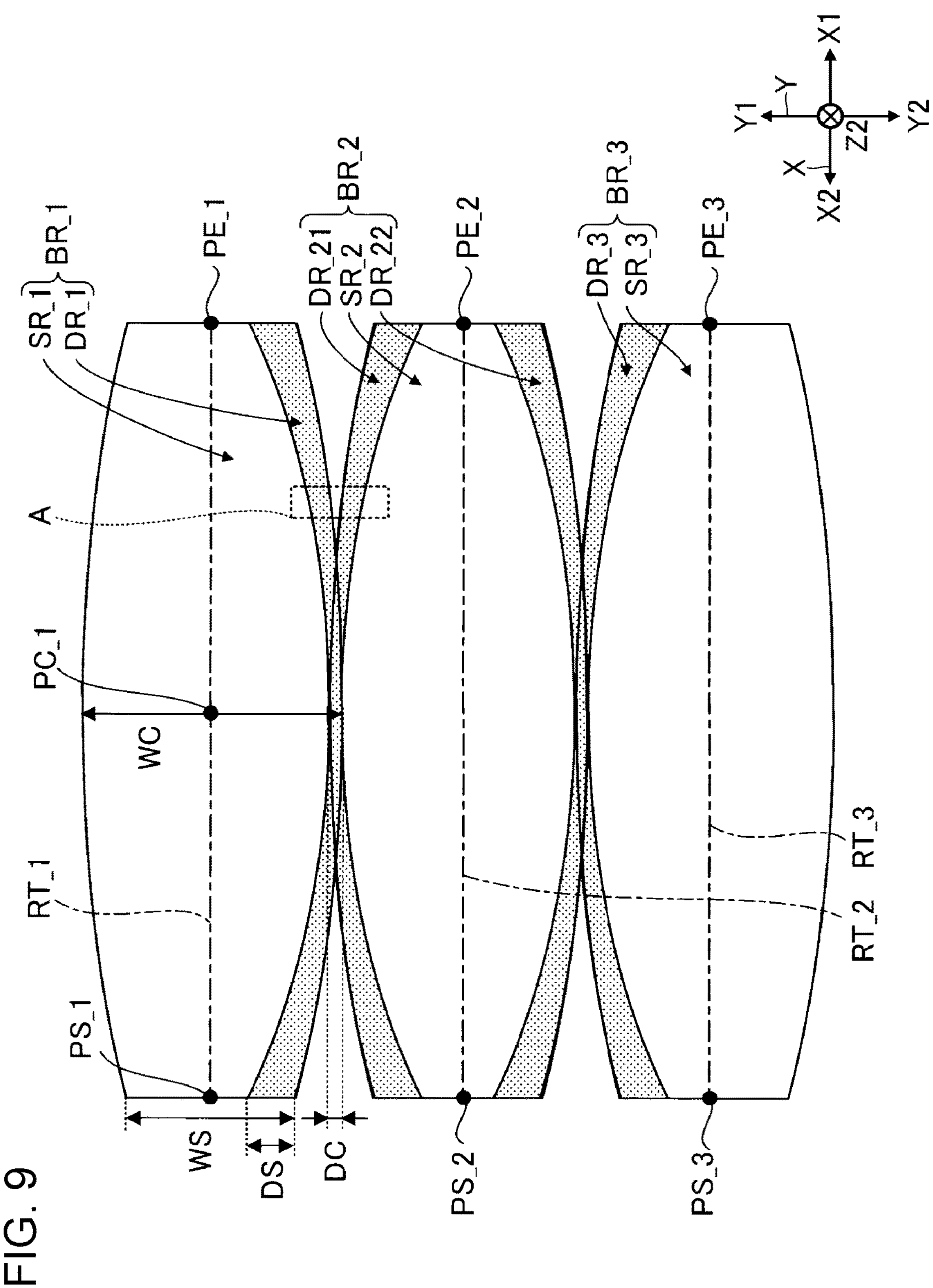
FIG. 9 is a diagram describing the band region.

FIGS. 8 and 9 are diagrams describing the band region BR according to the present embodiment. FIG. 8 illustrates a plan view of the workpiece W viewed in the Z2 direction, and in FIG. 9, the plurality of band regions BR are expanded on the XY plane for easy understanding.

As illustrated in FIG. 8, a certain band region BR differs from the band region BR-A in that the band region BR has an overlapping region DR that is a region in which the band region BR overlaps with the adjacent band region BR. In the band region BR, a region that does not overlap with the adjacent band region BR may be described as a non-overlapping region SR. Specifically, as illustrated in FIGS. 8 and 9, the band region BR_1 has a non-overlapping region SR_1 and an overlapping region DR_1 that overlaps with the band region BR_2. The band region BR_2 has a non-overlapping region SR_2, an overlapping region DR_21 that overlaps with the band region BR_1, and an overlapping region DR_22 that overlaps with the band region BR_3. The band region BR_3 has a non-overlapping region SR_3 and an overlapping region DR_3 that overlaps with the band region BR_2. In the following description, each of the non-overlapping region SR_1, the non-overlapping region SR_2, and the non-overlapping region SR_3 may be described as the non-overlapping region SR without distinguishing each of the non-overlapping region SR_1, the non-overlapping region SR_2, and the non-overlapping region SR_3. In addition, without distinguishing each of the overlapping region DR_1, the overlapping region DR_21, the overlapping region DR_22, and the overlapping region DR_3, the overlapping region DR_1, the overlapping region DR_21, the overlapping region DR_22, and the overlapping region DR_3 may be described as the overlapping region DR. In the present embodiment, all of the band region BR_1, the band region BR_2, and the band region BR_3 have a substantially elliptical shape, and for example, the shape of the band region BR_2 may be a rectangular shape. In addition, as another example, the band region BR_1 and the band region BR_3 may be rectangular shapes, and only the band region BR_2 may be a substantially elliptical shape. The shape of the band region BR can be appropriately adjusted according to a shape of the printing region Wa.

As illustrated in FIG. 9, a width WS of the band region BR_1 at the start position PS_1 in the main scanning direction DΦ_1 is less than a width WC of the band region BR_1 at the position PC_1 in the main scanning direction DΦ_1. The position PC_1 is a central position of the path RT_1. Further, as can be understood from FIGS. 8 and 9, a part of the band region BR_1 overlaps with a part of the band region BR_2 at the start position PS_1. In addition, "at the start position PS_1 in the main scanning direction DΦ_1" means a virtual line along the sub-scanning direction Dθ perpendicular to the main scanning direction DΦ_1, in addition to the start position PS_1. Therefore, the fact that the part of the band region BR_1 overlaps with the part of the band region BR_2 at the start position PS_1 means that a part of a portion of the band region BR_1 that overlaps with the virtual line described above overlaps with the band region BR_2. A width of the band region BR is a length of a surface of the workpiece W in a direction along the sub-scanning direction Dθ.

The band region BR_1 is an example of a "first band region", the main scanning direction DΦ_1 is an example of a "first main scanning direction", and the printing operation in which the head 3*a* ejects inks to the workpiece W while being changed along the main scanning direction DΦ_1 is an example of a "first printing operation". Further, the band region BR_2 is an example of a "second band region", the main scanning direction DΦ_2 is an example of a "second main scanning direction", and the printing operation in which the head 3*a* ejects the inks to the workpiece W while being changed along the main scanning direction DΦ_2 is an example of a "second printing operation". The start position PS_1 in the main scanning direction DΦ_1 is an example of a "first position", the width WS is an example of a "first width", the position PC_1 in the main scanning direction DΦ_1 is an example of a "second position", and the width WC is an example of a "second width".

In addition, as illustrated in FIGS. 8 and 9, the band region BR_1 has a portion that does not overlap with the band region BR_2 at the start position PS_1. The band region BR_1 has a portion that does not overlap with the band region BR_2 at the position PC_1. In addition, "at the position PC_1" means on a virtual line along the sub-scanning direction Dθ perpendicular to the main scanning direction DΦ_1, in addition to the position PC_1. Therefore, the portion in which the band region BR_1 does not overlap with the band region BR_2 at the position PC_1 means a portion in which the virtual line described above and the non-overlapping region SR_1 overlap with each other.

In addition, as illustrated in FIGS. 8 and 9, at the position PC_1, the band region BR_1 has both the portion that does not overlap with the band region BR_2 and the portion that overlaps with the band region BR_2. In addition, as understood from FIGS. 8 and 9, the position PC_1 is a position at which the width of the band region BR_1 is the largest.

Further, in the first embodiment, the overlapping width DS which is a width of the overlapping region DR_1 at the position PS_1 is equal to or more than the overlapping width DC which is a width of the overlapping region DR_1 at the position PC_1. In the example in FIG. 9, the overlapping width DS is more than the overlapping width DC. The overlapping width DS is an example of a "first overlapping width", and the overlapping width DC is an example of a "second overlapping width".

Figure 10:
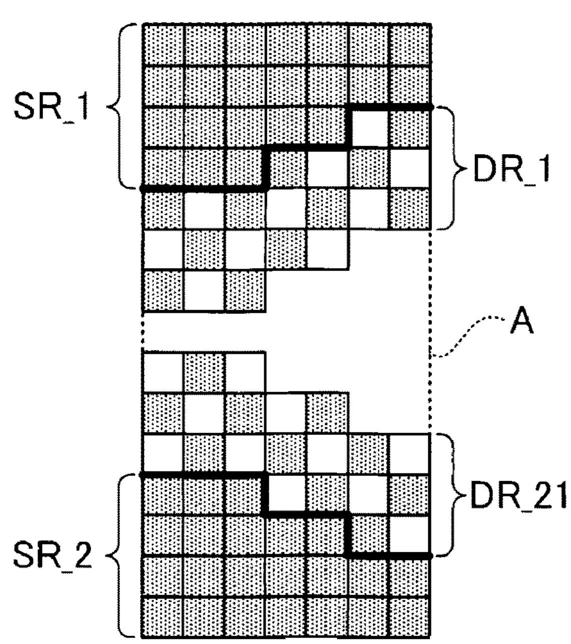
FIG. 10 is a diagram illustrating a relationship between recording pixels of print data in a band region and a band region in a region in FIG. 9.

FIG. 10 is a diagram illustrating a relationship between the recording pixels of the print data Img in the band region BR_1 and the band region BR_2 in the region A in FIG. 9. For simplification of the description, FIG. 10 illustrates an example of forming a so-called "solid image", which is a printing image in which liquid droplets are applied to all pixels corresponding to the printing region Wa. In order to form a partial image to be formed in each band region BR of the plurality of band regions BR in a printing operation which will be described below, the computer 7 generates the print data Img indicating the partial image corresponding to each band region BR of the plurality of band regions BR, prior to the printing operation. The computer 7 generates the print data Img such that a recording ratio of each band region BR is 100% by itself in the non-overlapping region SR in the two adjacent band regions BR. In addition, in the overlapping regions DR in the two adjacent band regions BR, the computer 7 generates the print data Img such that a total of a recording ratio of the overlapping region DR in one band region BR and a recording ratio of the overlapping region DR in the other band region BR is 100%.

For example, in FIG. 10, the recording pixels are disposed such that any recording ratio of the non-overlapping region SR_1 of the band region BR_1 indicated by shaded pixels and the non-overlapping region SR_2 of the band region BR_2 indicated by shaded pixels in the same manner is 100% by itself. In addition, in FIG. 10, the recording pixels of two regions of the overlapping region DR_1 of the band region BR_1 indicated by shaded pixels and the overlapping region DR_21 of the band region BR_2 indicated by shaded pixels in the same manner are exclusively and intermittently disposed. In other words, the recording pixels, which are pixels at which the liquid droplets are disposed, are appropriately dispersed and disposed such that the recording ratio is 100% in a total of the two. Such a disposition is realized by applying a mask pattern stored in advance in the computer 7 to the printing image. The recording pixel is a pixel corresponding to a position to which liquid droplets are applied in the band region BR, and the recording ratio is a ratio of the recording pixels to all the pixels corresponding to the band region BR.

FIG. 10 illustrates an example in which the computer 7 generates the print data Img such that a recording ratio of the overlapping region DR_1 and a recording ratio of the overlapping region DR_21 are approximately 50% at both positions, and the recording ratios may be changed inside each of the overlapping regions DR. For example, inside the overlapping region DR_1, it is possible to set the recording ratio to be increased as the position approaches the non-overlapping region SR_1, and set the recording ratio to be decreased as the position moves away from the non-overlapping region SR_1. In this case, inside the overlapping region DR_21, the recording ratio is increased as the position approaches the non-overlapping region SR_2, and the recording ratio is decreased as the position moves away from the non-overlapping region SR_21. That is, a gradation in which the recording ratio in the overlapping region DR is changed stepwise can be used, and the gradation can be superimposed. In this manner, it is possible to prevent a conspicuous difference between the image of the overlapping region DR and the image of the non-overlapping region SR. In addition, in FIG. 10, the disposition of the pixels is illustrated on a plane as a set of squares for easy understanding, and may be disposed three-dimensionally, and include a set of rectangular parallelepipeds, a set of spheres, a set of three-dimensional coordinate information, or the like.

The specific lengths of the overlapping width DS and the overlapping width DC are determined when the computer 7 generates the print data Img. In this determination, the user may input any value, a default value stored in advance in the computer 7 may be used, or an appropriate value calculated by the computer 7 according to a shape of the workpiece W may be used. For example, it is possible to construct an algorithm in which the width of the overlapping region DR is decreased in response to the increase in the width of the band region BR, and such a relationship is represented by any function such as a linear function. Since the appropriate lengths of the overlapping width DS and the overlapping width DC may be changed depending on the shape of the workpiece W, performance of the head 3*a*, characteristics of the ink, a speed or a weight of the liquid droplets ejected by the head 3*a*, and the like, it is preferable that the overlapping width DS is appropriately adjusted within a range more than the overlapping width DC according to these conditions.

Figure 11:
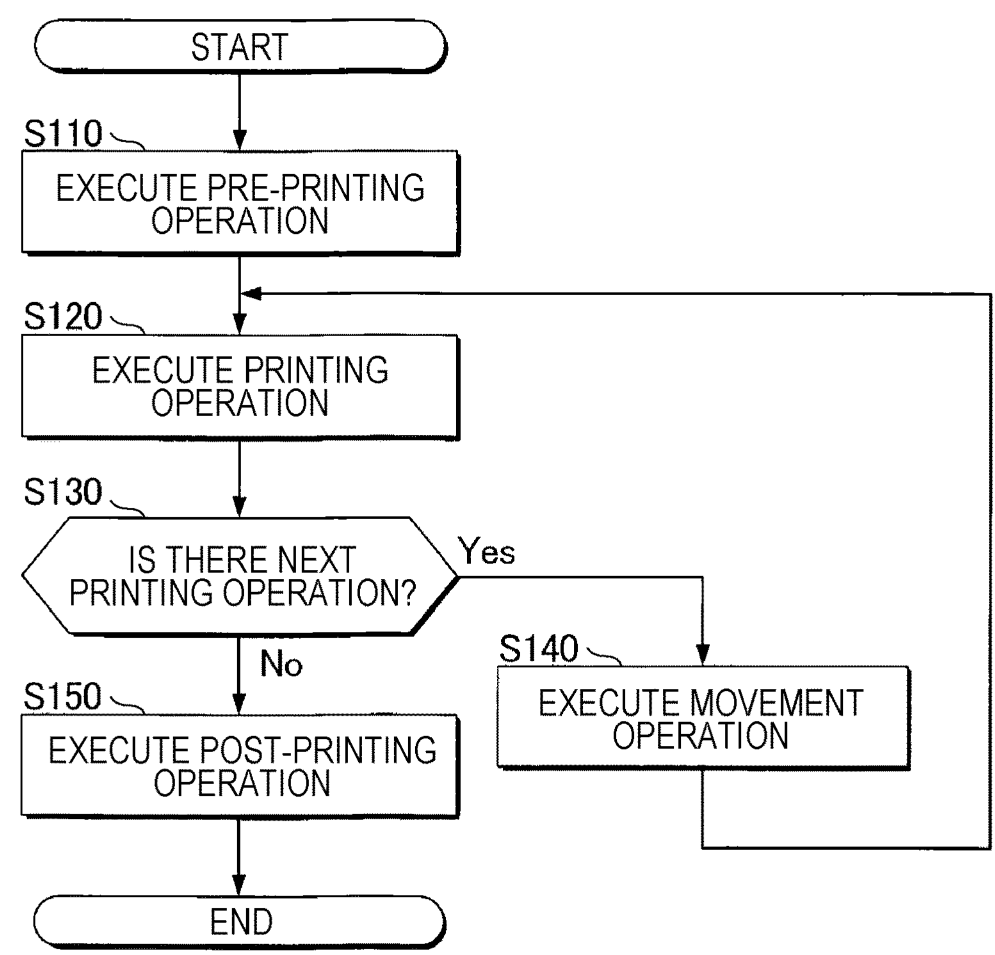
FIG. 11 is a flowchart illustrating a flow of a three-dimensional object printing method.

1-5. Operation of Three-Dimensional Object Printing Apparatus 1 and Three-Dimensional Object Printing Method FIG. 11 is a flowchart illustrating a flow of a three-dimensional object printing method according to the first embodiment. The three-dimensional object printing method is performed by using the three-dimensional object printing apparatus 1 described above. A series of operations illustrated in FIG. 11 is executed by the computer 7 controlling the robot 2 and the head unit 3 via the controller 5 and the control module 6.

In step S110, the three-dimensional object printing apparatus 1 executes a pre-printing operation. The pre-printing operation in step S110 is an operation in which the robot 2 changes a relative position of the head 3*a* with respect to the workpiece W before a printing operation. In the pre-printing operation, the head 3*a* does not eject inks. The pre-printing operation includes, for example, a preparation operation such as an operation in which the robot 2 moves the head 3*a* from a position at which a cap, which is not illustrated, for covering the nozzle surface FN is provided to the start position PS of any one band region BR among the plurality of band regions BR, an operation in which the rotation axis O2, the rotation axis O3, and the rotation axis O5 are in a state to be parallel to each other, and the like. The fact that the rotation axis O2, the rotation axis O3, and the rotation axis O5 are parallel to each other means that the rotation axis O2 and the rotation axis O3 are parallel to each other, the rotation axis O3 and the rotation axis O5 are parallel to each other, and the rotation axis O2 and the rotation axis O5 are parallel to each other. In the pre-printing operation, all of the six joints 230 of the robot 2 can be operated.

After step S110 is ended, the three-dimensional object printing apparatus 1 executes the printing operation in step S120. The printing operation is an operation in which the head 3*a* ejects inks while the robot 2 changes the relative position of the head 3*a* with respect to the workpiece W in the main scanning direction DΦ. Although the number of joints 230 that operate in the printing operation among the plurality of joints 230 is not particularly limited, in the printing operation, the head 3*a* may be moved by operations of a smaller number of joints 230 than in the pre-printing operation. As compared with the pre-printing operation, a deviation of an actual movement path from an ideal movement path of the head 3*a* is reduced by operating the smaller number of joints 230.

In addition, in order to form a partial image to be formed in each band region BR of the plurality of band regions BR in the printing operation, the computer 7 generates the print data Img indicating the partial image corresponding to each band region BR of the plurality of band regions BR, prior to the printing operation. The generation of the print data Img by the computer 7 is as described above.

After step S120 is ended, the three-dimensional object printing apparatus 1 determines whether or not to execute the next printing operation in step S130. In other words, the three-dimensional object printing apparatus 1 determines whether or not there is a band region BR in which the printing operation is not executed among the plurality of band regions BR.

When the determination result in step S130 is positive, the three-dimensional object printing apparatus 1 executes a movement operation in step S140. The positive determination result in step S130 is a case where the next printing operation is to be executed, and can be said that there is a band region BR in which the printing operation is not executed among the plurality of band regions BR. The movement operation is an operation of moving the head 3*a* to the start position PS of the band region BR corresponding to the next printing operation. In the movement operation, the head 3*a* does not eject the inks. In the movement operation, the robot 2 changes a posture of the head 3*a* while fixing a posture of the workpiece W. After step S140 is ended, the three-dimensional object printing apparatus 1 executes the printing operation in step S120.

When the determination result in step S130 is negative, the three-dimensional object printing apparatus 1 executes a post-printing operation in step S150. The fact that the determination result in step S130 is negative is a case where the next printing operation is not to be executed, and can be said to be a case where the printing operation is executed for the plurality of band regions BR. The post-printing operation includes, for example, an operation in which the robot 2 moves the head 3*a* from the end position PE of any one of the plurality of band regions BR to another position. The other position is, for example, the position at which the cap described above is provided. In the post-printing operation, all of the six joints 230 of the robot 2 can be operated, and the head 3*a* is moved by operations of a larger number of joints 230 than in the printing operation. After step S150 is ended, the three-dimensional object printing apparatus 1 ends the series of operations illustrated in FIG. 11.

1-6. Summary of First Embodiment

Hereinafter, a summary of the first embodiment will be described by using an example in which in step S120 for the first time, a printing operation on the band region BR_1 is executed, and in the second step S120, the printing operation on the band region BR_2 is executed. In the summary of the first embodiment, the printing operation in step S120 for the first time is an example of the "first printing operation", and the printing operation in step S120 for the second time is an example of the "second printing operation". The printing operation for the first time in step S120 is described as a first-time printing operation, and the printing operation in step S120 for the second time is described as a second-time printing operation.

As described above, the three-dimensional object printing apparatus 1 according to the first embodiment is a three-dimensional object printing apparatus including the head 3*a* that ejects inks onto the printing region Wa on the workpiece W, and the robot 2 which is a movement mechanism that changes the relative position and posture between the workpiece W and the head 3*a*. The three-dimensional object printing apparatus 1 executes the first-time printing operation of ejecting the inks from the head 3*a* to the workpiece W while changing the relative position between the workpiece W and the head 3*a* along the main scanning direction DΦ_1, and a second-time printing operation of ejecting the inks from the head 3*a* to the workpiece W while changing the relative position between the workpiece W and the head 3*a* along the main scanning direction DΦ_2.

Further, in the three-dimensional object printing method according to the first embodiment, step S120 of executing the first-time printing operation of ejecting the inks from the head 3*a* to the workpiece W while changing the relative position between the workpiece W and the head 3*a* along the main scanning direction DΦ_1, and step S120 of executing the second-time printing operation of ejecting the inks from the head 3*a* to the workpiece W while changing the relative position between the workpiece W and the head 3*a* along the main scanning direction DΦ_2 are executed.

The printing region Wa includes the band region BR_1 in which the ink is ejected from the head 3*a* in the first-time printing operation and the band region BR_2 in which the ink is ejected from the head 3*a* in the second-time printing operation. When a width of the band region BR_1 at the position PS_1 in the main scanning direction DΦ_1 is set as the width WS and the width of the band region BR_1 at the position PC_1 different from the position PS_1 in the main scanning direction DΦ_1 is set as the width WC, the width WS is less than the width WC, and a part of the band region BR_1 overlaps with a part of the band region BR_2 at the position PS_1.

With the first embodiment, even when the start position PS of the band region BR deviates, it is possible to prevent the generation of the white stripe WT and the black stripe BT by the overlapping region DR, and thus the deterioration in quality of the image formed in the printing region Wa can be prevented. The reason why the generation of the white stripe WT and the black stripe BT can be prevented by the overlapping region DR will be described with reference to FIG. 12.

Figure 12:
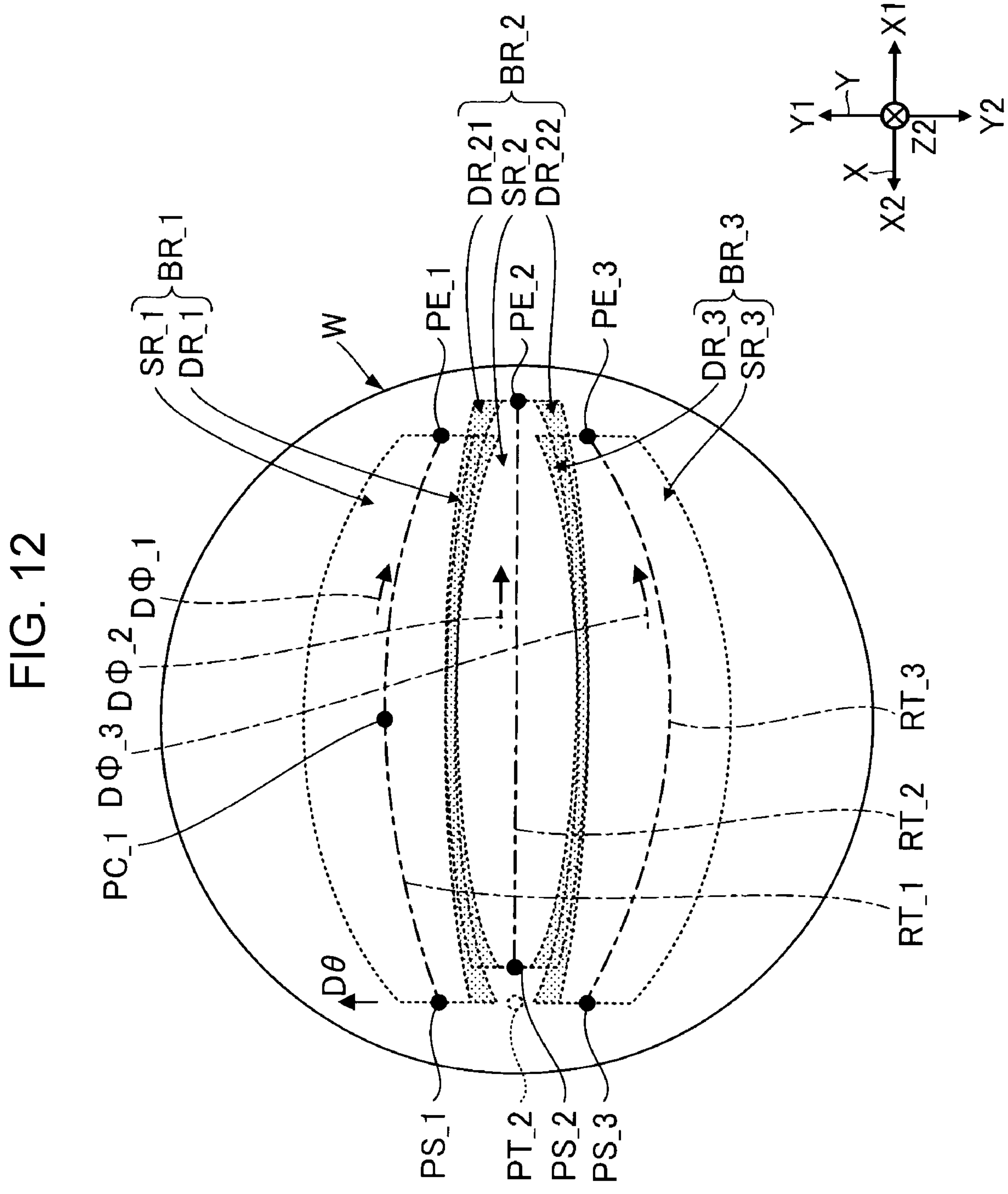
FIG. 12 is a diagram describing a state when a start position deviates.

FIG. 12 is a diagram describing a state when the start position PS_2 deviates. The example in FIG. 12 illustrates an example when the start position PS_2 deviates from the original start position PT_2 of the path RT_2 in the X1 direction. In addition, in FIG. 12, the overlapping region DR of the band region BR when the start position PS_2 does not deviate is shaded. The overlapping region DR means a region that overlaps with the adjacent band region BR in a state where the start position PS does not deviate. Therefore, when the start position PS deviates, as illustrated in FIG. 12, a part or an entirety of the overlapping region DR may not overlap with the adjacent band region BR.

As a result of the deviation of the start position PS_2 in the X1 direction, the band region BR_2 also deviates in the X1 direction. Meanwhile, even when the band region BR_2 deviates, in the example in FIG. 12, an overlapping region of the overlapping regions DR is only narrowed at an end portion of the band region BR_2 in the X2 direction, and there is no gap onto which the ink does not adhere. Therefore, the three-dimensional object printing apparatus 1 according to the present embodiment can prevent the generation of the white stripe WT. In addition, at the end portion of the band region BR_2 in the X1 direction, the non-overlapping region SR and the overlapping region DR only overlap with each other, and the non-overlapping regions SR do not overlap each other. The amount of ink ejected to a region in which the non-overlapping region SR and the overlapping region DR overlap with each other is less than the amount of ink ejected to a region in which the non-overlapping regions SR overlap with each other. Therefore, the three-dimensional object printing apparatus 1 according to the present embodiment can prevent the generation of the black stripe BT generated by the overlapping of the non-overlapping regions SR.

The description is returned to the summary of the first embodiment. At the start position PS_1, the band region BR_1 has the non-overlapping region SR_1 which is a portion that does not overlap with the band region BR_2. At the position PC_1, the band region BR_1 has the non-overlapping region SR_1 which is a portion that does not overlap with the band region BR_2.

As the overlapping region DR in the band region BR is larger, it is possible to prevent the generation of the white stripe WT and the black stripe BT when the start position PS deviates. Meanwhile, when the overlapping region DR is larger, it is necessary to increase the number of band regions BR in the printing region Wa, so that a tact time required for manufacturing a product becomes longer and the productivity of the product is decreased. Therefore, with the present embodiment, by providing the overlapping region DR at the start position PS_1, the generation of the white stripe WT and the black stripe BT is prevented, and by providing the non-overlapping region SR, the tact time required for manufacturing the product is shorter as compared with an aspect in which the non-overlapping region SR is not provided, and the productivity of the product can be improved.

At the position PC_1, the band region BR_1 has both the non-overlapping region SR_1 which is a portion that does not overlap with the band region BR_2 and the overlapping region DR_1 which is a portion overlapping with the band region BR_2. Further, the position PC_1 is a position at which the width of the band region BR_1 is the largest.

When the start position PS deviates, the black stripe BT may be generated even at a position at which the width of the band region BR_1 is wide such as the position PC_1. Specifically, as illustrated in FIG. 6, the black stripe BT may be generated from the end of the band region BR-A_2 in the X1 direction to the vicinity of a position PC_2. Therefore, by providing the overlapping region DR at a position at which the width of the band region BR_1 is the largest, it is possible to prevent the generation of the black stripe BT and prevent the deterioration in quality of the image formed in the printing region Wa.

In addition, when at the position PS_1, a width of the overlapping region DR_1 which is a portion in which the band region BR_1 overlaps with the band region BR_2 is set as the overlapping width DS, and at the position PC_1, a width of the overlapping region DR_1 which is a portion in which the band region BR_1 overlaps with the band region BR_2 is set as the overlapping width DC, the overlapping width DS is equal to or more than the overlapping width DC.

In the first embodiment, the overlapping width DS is more than the overlapping width DC.

As understood from FIGS. 6 and 7, since the white stripe WT and the black stripe BT become more remarkable at the end portion in the X1 direction and at the end portion in the X2 direction, it is preferable that the overlapping region DR is wide at the position PS_1, which is an end portion. Further, at the position PC_1 which is a center portion in the X-axis, the more the overlapping region DR, the less the non-overlapping region SR, and thus a region that can be printed in one band region BR is decreased and the number of band regions BR in the printing region Wa is increased, so that the tact time required for manufacturing the product is increased and the productivity of the product is decreased. With the first embodiment, since the overlapping width DS is more than the overlapping width DC, it is possible to prevent the decrease in productivity, as compared with an aspect in which the overlapping width DS is less than the overlapping width DC.

Further, the robot 2 changes the posture of the head 3*a* while fixing the posture of the workpiece W, in the movement operation in step S140 between the first-time printing operation and the second-time printing operation. The changing of the posture of the head 3*a* while fixing the posture of the workpiece W is an example of "changing one or both of the posture of the head 3*a* and the posture of the workpiece W". Therefore, the robot 2 may change the posture of the workpiece W while fixing the posture of the head 3*a*, or may change both the posture of the head 3*a* and the posture of the workpiece W.

When the printing region Wa is a curved surface, it is necessary to change one or both of the posture of the head 3*a* and the posture of the workpiece W between a plurality of printing operations. With the aspect in which one or both of the posture of the head 3*a* and the posture of the workpiece W are changed between the plurality of printing operations, a start position of the printing operation is likely to deviate, as compared with an aspect in which between the head 3*a* and the workpiece W, only the relative position can be changed and the posture can be fixed during the plurality of printing operations. Therefore, with the first embodiment, the generation of the white stripe WT and the black stripe BT to be generated due to the deviation of the start position, which is likely to occur when the printing region Wa is a curved surface, can be prevented by providing the overlapping region DR.

2. Second Embodiment

In the first embodiment, the overlapping width DS is more than the overlapping width DC. Meanwhile, the overlapping width DS and the overlapping width DC may have the same length. A second embodiment will be described below.

Figure 13:
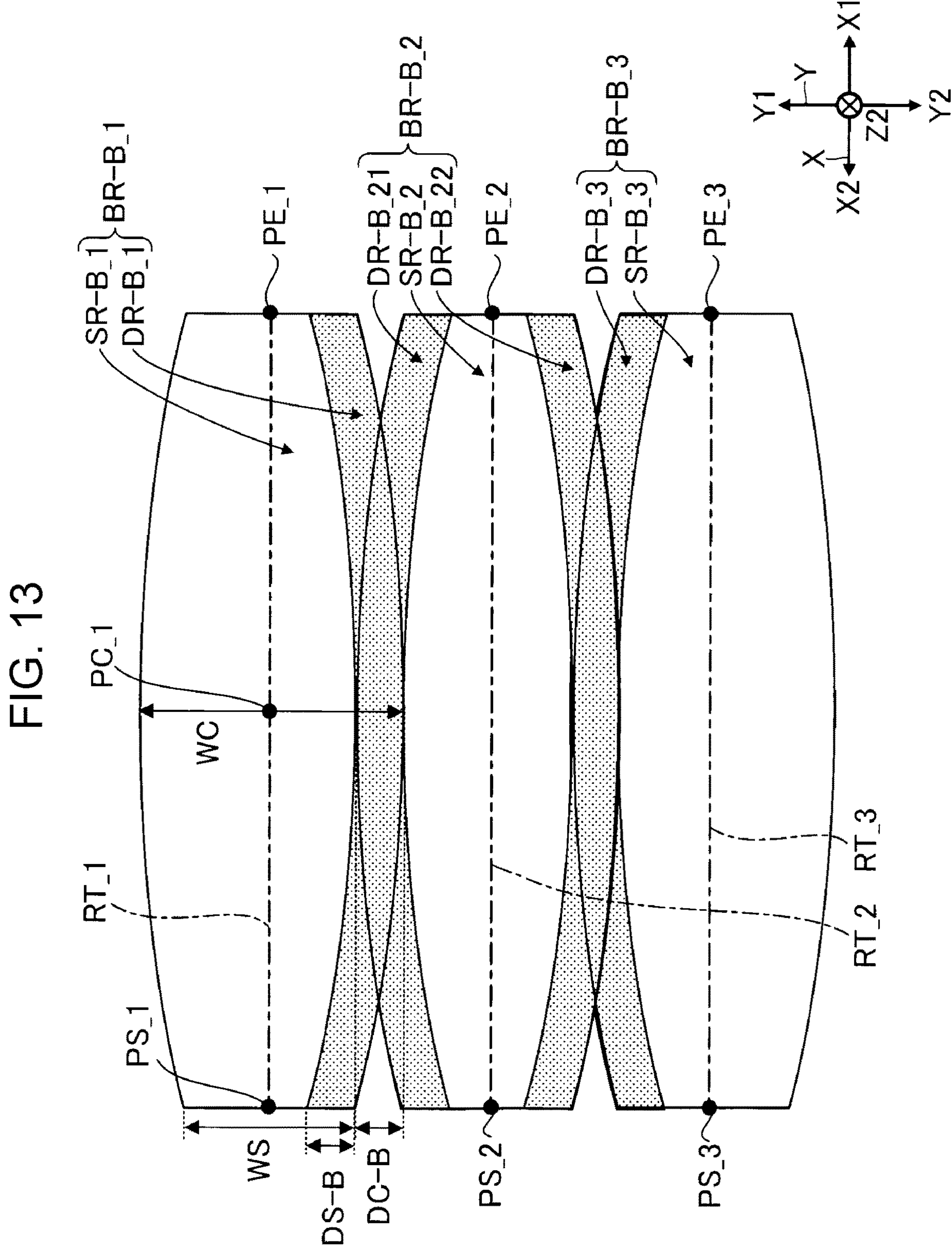
FIG. 13 is a diagram describing a band region according to the second embodiment.

FIG. 13 is a diagram describing a band region BR-B according to the second embodiment. In the example in FIG. 13, the printing region Wa includes a band region BR-B_1, a band region BR-B_2, and a band region BR-B_3. Hereinafter, without distinguishing each of the band region BR-B_1, the band region BR-B_2, and the band region BR-B_3, the band region BR-B_1, the band region BR-B_2, and the band region BR-B_3 may be collectively referred to as the band region BR-B. In FIG. 13, for easy understanding, each of the three band regions BR-B is expanded in the XY plane.

The band region BR-B_1 has a non-overlapping region SR-B_1 and an overlapping region DR-B_1 that overlaps with the band region BR-B_2. The band region BR-B_2 has a non-overlapping region SR-B_2, an overlapping region DR-B_21 that overlaps with the band region BR-B_1, and an overlapping region DR-B_22 that overlaps with the band region BR-B_3. The band region BR-B_3 has a non-overlapping region SR-B_3 and an overlapping region DR-B_3 that overlaps with the band region BR-B_2. In the following description, each of the non-overlapping region SR-B_1, the non-overlapping region SR-B_2, and the non-overlapping region SR-B_3 may be described as a non-overlapping region SR-B without distinguishing each of the non-overlapping region SR-B_1, the non-overlapping region SR-B_2, and the non-overlapping region SR-B_3. In addition, without distinguishing each of the overlapping region DR-B_1, the overlapping region DR-B_21, the overlapping region DR-B_22, and the overlapping region DR-B_3, the overlapping region DR-B_1, the overlapping region DR-B_21, the overlapping region DR-B_22, and the overlapping region DR-B_3 may be described as an overlapping region DR-B.

As illustrated in FIG. 13, in the second embodiment, a width of the overlapping region DR-B is constant. Specifically, an overlapping width DS-B which is a width of the overlapping region DR-B_1 at the position PS_1 has the same length as an overlapping width DC-B which is a width of the overlapping region DR-B_1 at the position PC_1. The fact that the overlapping width DS-B and the overlapping width DC-B have the same length includes not only the case where the overlapping width DS-B and the overlapping width DC-B are completely the same but also the case where the lengths can be regarded as the same when a resolution of the three-dimensional object printing apparatus 1 is considered. For example, when the resolution of the three-dimensional object printing apparatus 1 is $\alpha$ dpi and a difference between the overlapping width DS-B and the overlapping width DC-B is equal to or less than $20/\alpha$ inches, it can be considered that the overlapping width DS-B and the overlapping width DC-B are the same length. $\alpha$ is a positive integer, and is a number from 600 to 1200, for example.

In the second embodiment, the overlapping width DS-B is an example of the "first overlapping width", and the overlapping width DC-B is an example of the "second overlapping width".

Since the width of the overlapping region DR-B is constant, when an area of one band region BR in the first embodiment and an area of one band region BR-B in the second embodiment are the same, a width of the non-overlapping region SR at the position PC_1 is more than a width of the non-overlapping region SR-B at the position PC_1.

As described above, with the second embodiment, the overlapping width DS-B and the overlapping width DC-B are the same.

The width of the overlapping region DR in the first embodiment is changed according to the main scanning direction DΦ, and when the width of the overlapping region DR is changed, unevenness is likely to occur at a portion at which the width is changed. For example, when a portion of the band region BR_1 in which the width of the overlapping region DR is small and a portion of the band region BR_2 in which the width of the overlapping region DR is large overlap with each other, stripes due to unevenness are generated around the overlapping region DR. On the other hand, in the second embodiment, since the width of the overlapping region DR-B is constant, even when the start position PS deviates, it is possible to prevent the generation of the stripes due to the unevenness around the overlapping region DR-B, as compared with the first embodiment. Further, since the width of the overlapping region DR-B is constant, it is possible to continuously apply a mask pattern for appropriately dispersing and arranging the recording pixels in the main scanning direction DΦ and the generation of the print data Img for each band region BR in the computer 7 becomes relatively simple, and thus it is possible to prevent the decrease in other processing power of the computer 7 and the time required for generating the print data Img is decreased, and the productivity is improved.

3. Third Embodiment

The first embodiment and the second embodiment are the aspects in which the portions of the two adjacent band regions BR overlap with each other at the center portion of the band region BR in the direction along the X-axis. Meanwhile, a third embodiment has an aspect in which the two adjacent band regions BR do not overlap each other. Hereinafter, the third embodiment will be described.

Figure 14:
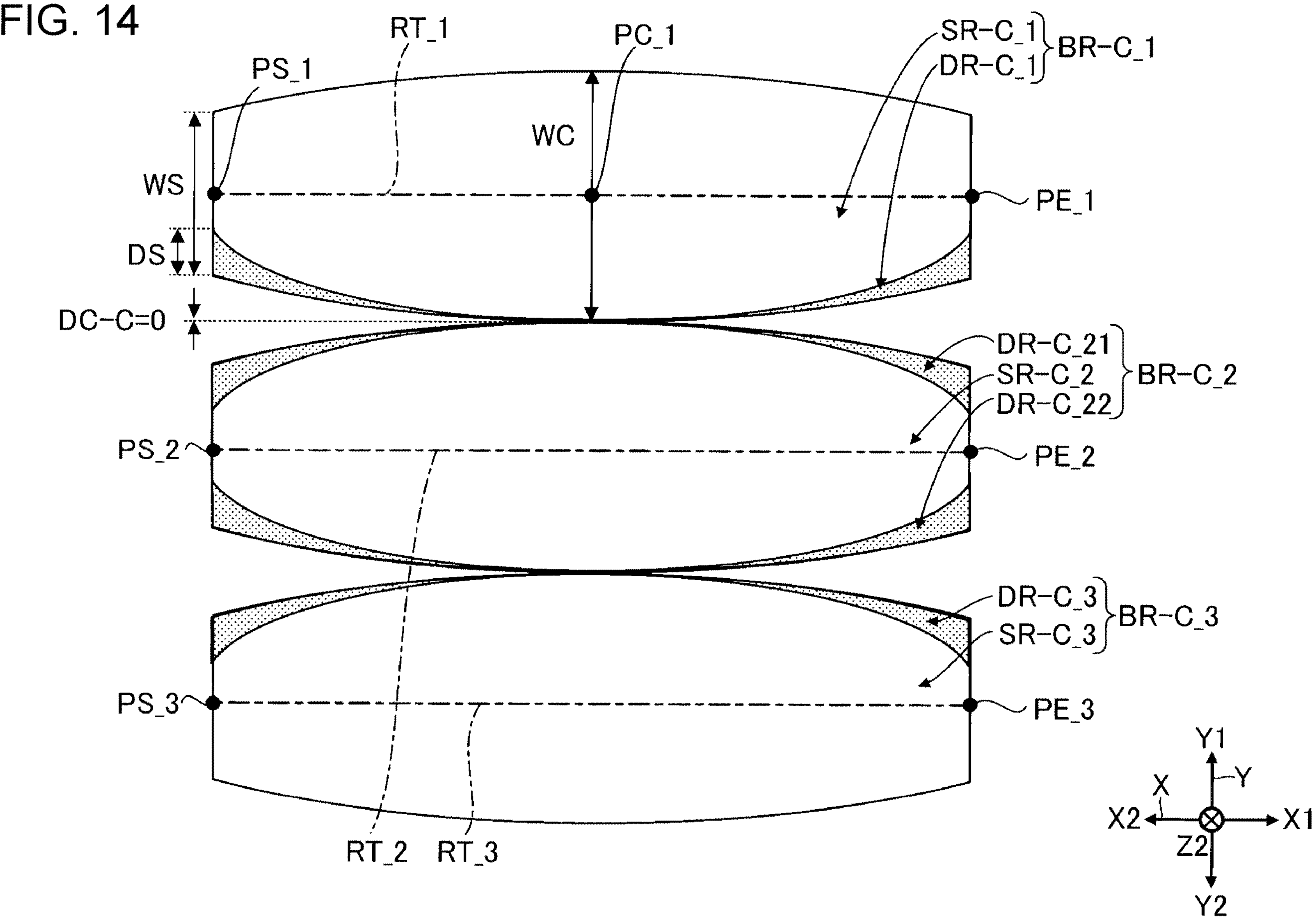
FIG. 14 is a diagram describing a band region according to a third embodiment.

FIG. 14 is a diagram describing a band region BR-C according to the third embodiment. In the example in FIG. 14, the printing region Wa includes a band region BR-C_1, a band region BR-C_2, and a band region BR-C_3. Hereinafter, without distinguishing each of the band region BR-C_1, the band region BR-C_2, and the band region BR-B_3, the band region BR-C_1, the band region BR-C_2, and the band region BR-B_3 may be collectively referred to as the band region BR-C. In FIG. 14, for ease of understanding, each of the three band regions BR-C is expanded in the XY plane.

The band region BR-C_1 has a non-overlapping region SR-C_1 and an overlapping region DR-C_1 that overlaps with the band region BR-C_2. The band region BR-C_2 has a non-overlapping region SR-C_2, an overlapping region DR-C_21 that overlaps with the band region BR-C_1, and an overlapping region DR-C_22 that overlaps with the band region BR-C_3. The band region BR-C_3 has a non-overlapping region SR-C_3 and an overlapping region DR-C_3 that overlaps with the band region BR-C_2. In the following description, each of the non-overlapping region SR-C_1, the non-overlapping region SR-C_2, and the non-overlapping region SR-C_3 may be described as a non-overlapping region SR-C without distinguishing the non-overlapping region SR-C_1, the non-overlapping region SR-C_2, and the non-overlapping region SR-C_3. In addition, without distinguishing each of the overlapping region DR-C_1, the overlapping region DR-C_21, the overlapping region DR-C_22, and the overlapping region DR-C_3, the overlapping region DR-C_1, the overlapping region DR-C_21, the overlapping region DR-C_22, and the overlapping region DR-C_3 may be described as an overlapping region DR-C.

As illustrated in FIG. 14, in the third embodiment, an overlapping width DC-C, which is a width of the overlapping region DR-C, is 0 at a center portion of the band region BR in a direction along the X-axis. In other words, at the position PC_1, the band region BR-C_1 does not have a portion that overlaps with the band region BR-C_2. In addition, the position PC_1 is a position at which the band region BR-C_1 has the largest width.

Since the overlapping region DR-C is not included at the position PC_1, a width in which ink application is to be completed in one printing operation is larger, and an increase in the number of band regions BR-C can be prevented. With the third embodiment, it is possible to prevent the decrease in the productivity of the product. On the other hand, since the width of the band region BR-C at the position PS_1 is less than the width of the band region BR-C at the position PC_1, the including of the overlapping region DR at the position PS_1 does not affect the increase in the number of band regions BR-C.

4. Fourth Embodiment

In the first embodiment, the second embodiment, and the third embodiment, the entire band region BR does not overlap with the adjacent band region BR at any position. Meanwhile, the present disclosure is not limited thereto. In a fourth embodiment, an aspect in which an entirety of the band region BR overlaps with the adjacent band regions BR at a position of an end portion of the band region BR in the X1 direction and a position of an end portion of the band region BR in the X2 direction will be described.

Figure 16:
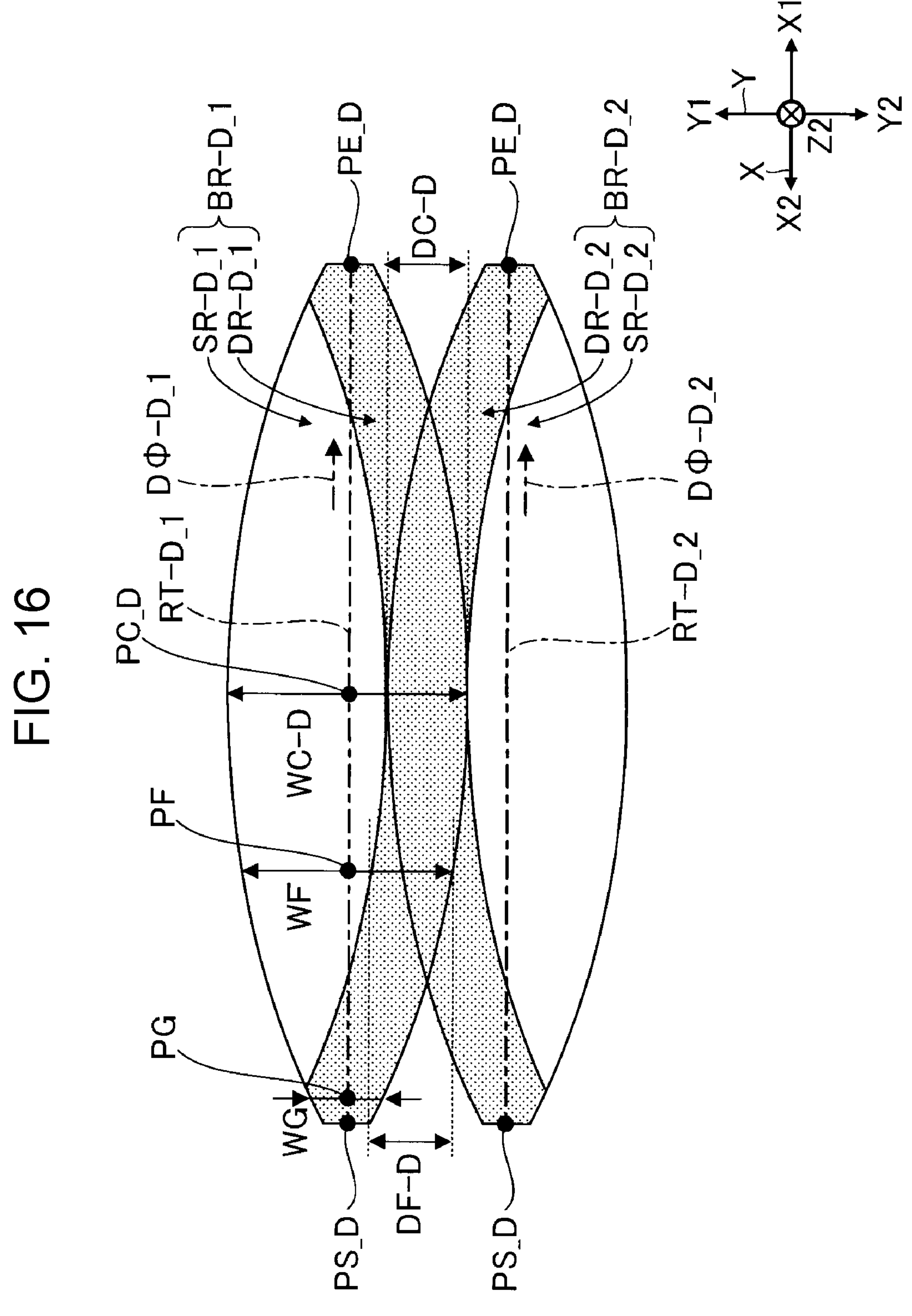
FIG. 16 is a diagram describing the band region according to the fourth embodiment.

FIGS. 15 and 16 are diagrams describing a band region BR-D according to the fourth embodiment. A workpiece W-D according to the fourth embodiment is a rugby ball that has a long spherical shape around a long axis AX. An end portion of the workpiece W-D in the X1 direction and an end portion of the workpiece W-D in the X2 direction have a spindle shape. A printing region Wa-D is a curved surface having a non-constant curvature. In the fourth embodiment, the workpiece W is disposed such that the long axis AX is parallel to the X-axis. FIG. 15 illustrates a plan view of the workpiece W-D when viewed in the Z2 direction, and in FIG. 16, for ease of understanding, the band region BR-D according to the fourth embodiment is expanded in the XY plane. In FIG. 16, as a display for convenience, the band region BR-D is displayed slightly smaller than the printing region Wa-D such that a contour of the band region BR-A does not overlap with a contour of the printing region Wa.

In the fourth embodiment, the printing region Wa-D includes a band region BR-D_1 and a band region BR-D_2. The band region BR-D_1 has a non-overlapping region SR-D_1 and an overlapping region DR-D_1 that overlaps with the band region BR-D_2. The band region BR-D_2 has a non-overlapping region SR-D_2 and an overlapping region DR-D_2 that overlaps with the band region BR-D_1.

A partial image is formed in the band region BR-D_1 by ejecting inks from the head 3*a* while the head 3*a* is moved along a path RT-D_1 along a main scanning direction DΦ-D_1. Further, a partial image is formed in the band region BR-D_2 by ejecting the inks from the head 3*a* while the head 3*a* is moved along a path RT-D_2 along a main scanning direction DΦ_2. As can be understood from FIG. 15, the path RT-D_1 and the path RT-D_2 are paths from a start position PS_D to an end position PE_D.

As illustrated in FIG. 16, a width WG of the band region BR-D_1 at a position PG in the main scanning direction DΦ-D_1 is less than a width WF of the band region BR-D_1 at a position PF in the main scanning direction DΦ-D_1. Further, the width WF is less than a width WC-D of the band region BR-D_1 at a position PC_D in the main scanning direction DΦ-D_1. The position PC_D is a central position of the path RT-D_1. The position PF is located between the position PG and the position PC_D. The position PG is located near the start position PS_D of the path RT_D_1. At the position PG, an entirety of the band region BR-D_1 overlaps with the band region BR-D_2.

In the fourth embodiment, the main scanning direction DΦ-D_1 is an example of the "first main scanning direction", the band region BR-D_1 is an example of the "first band region", and the band region BR-D_2 is an example of the "second band region". The position PF is an example of the "first position", and the width WF is an example of the "first width". The position PC_D is an example of the "second position", and the width WC-D is an example of the "second width". The position PG is an example of a "third position", and the width WG is an example of a "third width".

As illustrated in FIG. 16, in the fourth embodiment, in the same manner as the second embodiment, an overlapping width DC-D, which is a width of the overlapping region DR-D_1 at the position PC_D, is the same as an overlapping width DF-D, which is a width of the overlapping region DR-D_1 at the position PF. Meanwhile, in the same manner as the first embodiment, the overlapping width DC-D may be less than the overlapping width DF-D. Alternatively, the overlapping width DC-D may be 0, in the same manner as the third embodiment.

As described above, with the fourth embodiment, when the width of the band region BR-D_1 at the position PG different from the position PF and the position PC_D in the main scanning direction DΦ-D_1 is set as the width WG, the position PF is located between the position PC_D and the position PG, the width WG is less than the width WF, and at the position PG, the entirety of the band region BR-D_1 overlaps with the band region BR-D_2.

The position PG is a position close to a vertex of the spindle shape. With the fourth embodiment, the printing can also be performed on a position close to the vertex of the spindle shape or the like.

5. Modification Examples

Each form exemplified above can be variously modified. A specific aspect of the modification is illustrated below. Any two or more aspects selected from the following examples can be combined as appropriate as long as there is no contradiction.

5-1. First Modification Example

In the printing operation in step S130 in each of the aspects described above, the position of the head 3*a* is moved once from the start position PS to the end position PE with respect to one band region BR. Meanwhile, the present disclosure is not limited thereto. For example, the position of the head 3*a* may be moved a plurality of times along the path RT with respect to one band region BR, and the head 3*a* may eject inks in each of the plurality of movements. In each of the plurality of movements, the computer 7 generates the print data Img indicating a partial image corresponding to each of the plurality of movements. For example, when n times of movement are executed with respect to one band region BR, the computer 7 generates the print data Img such that the recording ratio is 1/n in one movement.

5-2. Second Modification Example

The printing region Wa of the workpiece W in each of the aspects described above is a projecting curved surface. Meanwhile, the present disclosure is not limited thereto. Another example of the surface of the workpiece W will be described as a second modification example.

Figure 17:
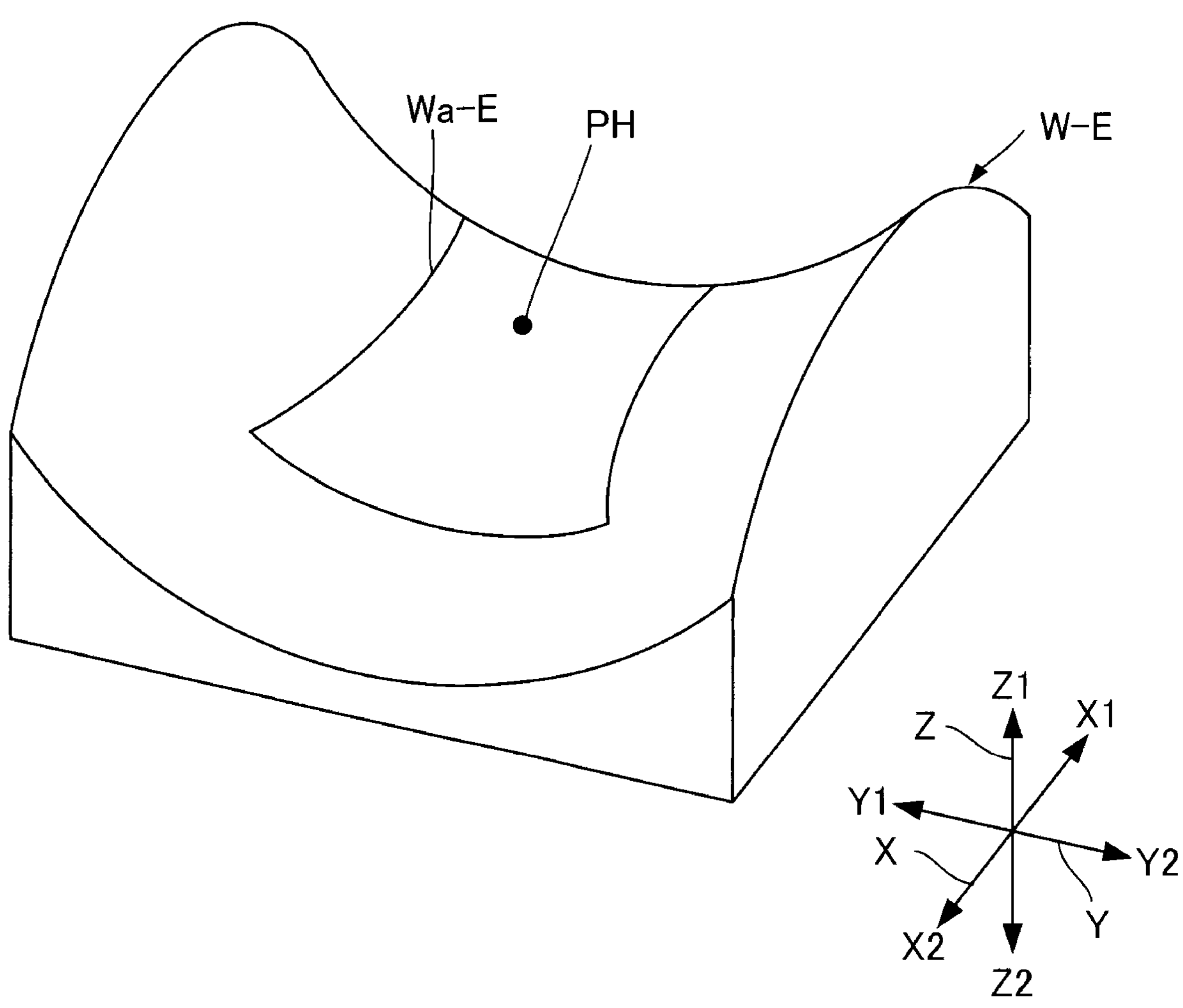
FIG. 17 is a perspective view of a workpiece according to a second modification example.

FIG. 17 is a perspective view of a workpiece W-E according to the second modification example. The workpiece W-E has a shape that imitates a saddle type of a horse. Specifically, the workpiece W-E is curved to project over the X2 direction to the X1 direction in the Z1 direction, and is curved to project over the Y1 direction to the Y2 direction in the Z2 direction. For simplification of the description, it is assumed that the workpiece W-E has a rectangular shape when viewed in the Z2 direction. A point PH illustrated in FIG. 17 is a centroid position of the workpiece W-E when viewed in the Z2 direction. A surface of the workpiece W-E includes a printing region Wa-E. The printing region Wa-E includes the point PH.

Figure 18:
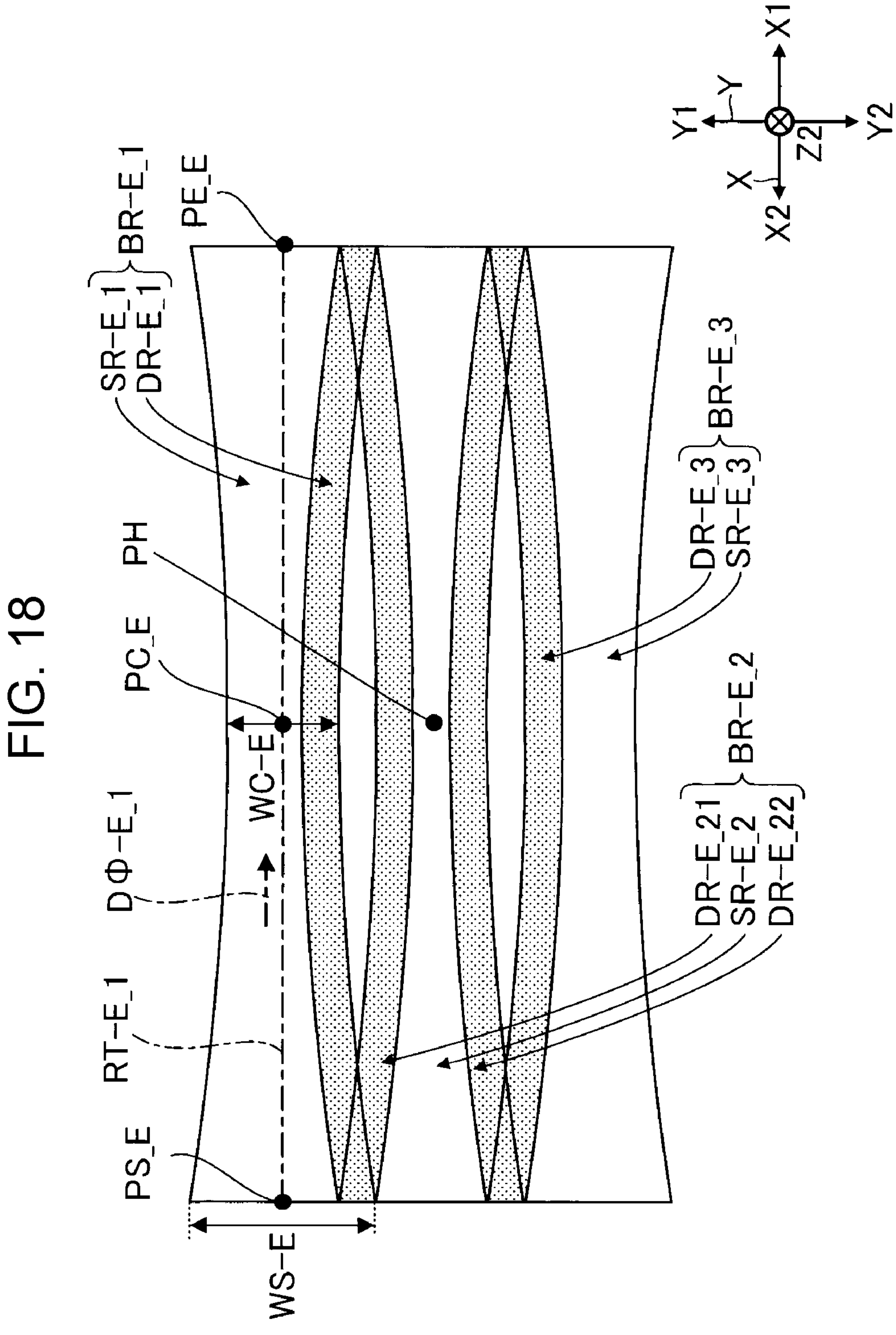
FIG. 18 is a diagram illustrating an example of a band region in the second modification example.

FIG. 18 is an example of a band region BR-E according to the second modification example. The printing region Wa-E includes a band region BR-E_1, a band region BR-E_2, and a band region BR-E_3. In FIG. 18, for easy understanding, a plurality of band regions BR-E are expanded in the XY plane.

The band region BR-E_1 has a non-overlapping region SR-E_1 and an overlapping region DR-E_1 that overlaps with the band region BR-E_2. The band region BR-E_2 has a non-overlapping region SR-E_2, an overlapping region DR-E_21 that overlaps with the band region BR-E_1, and an overlapping region DR-E_22 that overlaps with the band region BR-E_3. The band region BR-E_3 has a non-overlapping region SR-E_3 and an overlapping region DR-E_3 that overlaps with the band region BR-E_2. The point PH is included in the band region BR-E_2.

A partial image is formed in the band region BR-E_1 by ejecting inks from the head 3*a* while the head 3*a* is moved along a path RT-E_1 along a main scanning direction DΦ-E_1. As illustrated in FIG. 18, a width WC_E of the band region BR_1 at a position PC_E in the main scanning direction DΦ-E_1 is less than a width WS_E of the band region BR_1 at a start position PS_E in the main scanning direction DΦ_1. The position PC_E is at a center of the band region BR-E_1. In the second modification example, the position PC_E in the main scanning direction DΦ-E_1 is an example of the "first position", a width WC-E is an example of the "first width", the start position PS_E in the main scanning direction DΦ-E_1 is an example of the "second position", and a width WS-E is an example of the "second width".

5-3. Third Modification Example

The band region BR in each of the aspects described above has the non-overlapping region SR. Meanwhile, the band region BR may not have the non-overlapping region SR. For example, the band region BR_2 according to the first embodiment may include only the overlapping region DR_21 that overlaps with the band region BR_1 and the overlapping region DR_22 that overlaps with the band region BR_3, and may not have the non-overlapping region SR_2.

5-4. Fourth Modification Example

In each of the embodiments described above, the configuration using the 6-axis vertical multi-axis robot as the robot is described. Meanwhile, the configuration is not limited to this configuration. The robot 2 may be, for example, a vertical multi-axis robot other than the 6-axis robot, or a horizontal multi-axis robot. Further, the arm portion 220 of the robot 2 may have a telescopic mechanism, a linear motion mechanism, or the like in addition to the joint configured with the rotation mechanism. Meanwhile, from the viewpoint of the balance between the print quality in the printing operation and the degree of freedom of the robot 2 operation in the non-printing operation such as the pre-printing operation, the movement operation, and the post-printing operation, the robot 2 may be a multi-axis robot having 6 axes or more.

5-5. Fifth Modification Example

In each of the embodiments described above, the configuration using screwing or the like as a method of fixing the head 3*a* to the robot 2 is described, and the configuration is not limited to this configuration. For example, the head 3*a* may be fixed to the robot 2 by gripping the head 3*a* with a gripping mechanism such as a hand mounted as an end effector of the robot 2.

5-6. Sixth Modification Example

In each of the embodiments described above, the configuration in which printing is performed by using one type of ink is described. Meanwhile, the configuration is not limited to this configuration, and the present disclosure can be applied to a configuration in which printing is performed by using two or more types of ink.

5-7. Seventh Modification Example

The use of the three-dimensional object printing apparatus of the present disclosure is not limited to image printing. For example, a three-dimensional object printing apparatus that ejects a solution of a conductive material is used as a manufacturing apparatus of forming wirings or electrodes on a wiring substrate. In addition, the three-dimensional object printing apparatus can also be used as a jet dispenser of applying a liquid such as an adhesive to a medium.

5-8. Eighth Modification Example

In each of the embodiments described above, the configuration in which the head 3*a* is supported by the robot 2 and moved is described. Meanwhile, the configuration is not limited to this configuration. For example, the head 3*a* may be fixed to a base or the like, and the workpiece W may be supported by the robot 2 and moved.

What is claimed is:

1. A three-dimensional object printing apparatus comprising:

a head configured to eject a liquid to a printing region on a workpiece;

a movement mechanism configured to change a relative position and posture between the workpiece and the head; and a control portion configured to control the head and the movement mechanism, wherein the control portion is further configured to:

execute a first printing operation of ejecting the liquid from the head to the workpiece while changing the relative position between the workpiece and the head along a first main scanning direction;

execute a second printing operation of ejecting the liquid from the head to the workpiece while changing the relative position between the workpiece and the head along a second main scanning direction;

determine a width of a first band region into which the liquid is ejected from the head in the first printing operation;

determine a width of a second band region into which the liquid is ejected from the head in the second printing operation; and set a width of an overlapping region between the first band region and the second band region according to a position in the first main scanning direction, the width of the first band region at a first position in the first main scanning direction is defined as a first width, the width of the first band region at a second position different from the first position in the first main scanning direction is defined as a second width, the first width is less than the second width, and a part of the first band region overlaps with a part of the second band region at the first position, a width of a first portion at which the first band region overlaps with the second band region at the first position is defined as a first overlapping width, a width of a second portion at which the first band region overlaps with the second band region at the second position is defined as a second overlapping width, the first overlapping width is equal to or more than the second overlapping width, and a ratio of the first overlapping width to the first width is higher than a ratio of the second overlapping width to the second width.

2. The three-dimensional object printing apparatus according to claim 1, wherein at the first position, the first band region has a portion that does not overlap with the second band region, and at the second position, the first band region has a portion that does not overlap with the second band region.

3. The three-dimensional object printing apparatus according to claim 2, wherein at the second position, the first band region has both the portion that does not overlap with the second band region and the second portion that overlaps with the second band region.

4. The three-dimensional object printing apparatus according to claim 3, wherein the second position is a position at which the width of the first band region is the largest.

5. The three-dimensional object printing apparatus according to claim 1, wherein the second position is a position at which the width of the first band region is the largest.

6. The three-dimensional object printing apparatus according to claim 1, wherein the width of the first band region at a third position in the first main scanning direction is defined as a third width, and the third position is different from the first position and the second position, the first position is located between the second position and the third position, and the third width is less than the first width, and an entirety of the first band region overlaps with the second band region at the third position.

7. The three-dimensional object printing apparatus according to claim 1, wherein the movement mechanism is configured to change one or both of a posture of the head and a posture of the workpiece between the first printing operation and the second printing operation.

8. A three-dimensional object printing apparatus comprising:

a head that ejects a liquid to a printing region on a workpiece via a plurality of nozzles;

a movement mechanism that changes a relative position and posture between the workpiece and the head; and a controller configured to be programmed to control the head and the movement mechanism so as to:

perform a first printing operation of ejecting the liquid from the plurality of nozzles to a first band region in the printing region of the workpiece while changing the relative position between the workpiece and the head along a first main scanning direction;

make a recording pixel density in first edges, along a first sub scanning direction perpendicular to the first main scanning direction, of the first band region during the first printing operation be smaller than a recording density in a first intermediate area between the first edges by controlling an ejection amount of the liquid from the plurality of nozzles;

set a width of an overlapping region between the first band region and a second band region according to a position in the first main scanning direction;

perform a second printing operation of ejecting the liquid from the plurality of nozzles to a second band region in the printing region of the workpiece while changing the relative position between the workpiece and the head along a second main scanning direction that extends along the first main scanning direction rection; and make a recording pixel density in second edges, along a second sub scanning direction perpendicular to the second main scanning direction, of the second band region during the second printing operation be smaller than a recording density in a second intermediate area between the second edges by controlling the ejection amount of the liquid from the plurality of nozzles, wherein a first width along the first sub scanning direction of the first band region at a first position is smaller than a second width along the first sub scanning direction of first band region at a second position different from the first position, a third width along the second sub scanning direction of the second band region at a third position is smaller than a fourth width along the second sub scanning direction of the second band region at a fourth position different from the third position, and one of the first edges of the first band region and one of the second edges of the second band region are overlapped with each other at a common position of the first and third positions.

* * * * *